(12) United States Patent
Szeredi et al.

(10) Patent No.: US 11,356,288 B2
(45) Date of Patent: Jun. 7, 2022

(54) INTERACTIVE BROADCAST MANAGEMENT SYSTEM

(71) Applicant: LETS JOIN IN (HOLDINGS) PTY LTD, Ashburton (AU)

(72) Inventors: Geza Szeredi, Ashburton (AU); Giftson Selladurai Selvan Rajadurai, Ashburton (AU)

(73) Assignee: Lets Join In (Holdings) Pty., Ltd., Ashburton (AU)

( * ) Notice: Subject to any disclaimer, the term of this patent is extended or adjusted under 35 U.S.C. 154(b) by 0 days.

(21) Appl. No.: 16/409,478

(22) Filed: May 10, 2019

(65) Prior Publication Data

US 2019/0268174 A1    Aug. 29, 2019

Related U.S. Application Data

(63) Continuation of application No. PCT/AU2017/051238, filed on Nov. 13, 2017.

(30) Foreign Application Priority Data

Nov. 11, 2016   (AU) ................................ 2016904612

(51) Int. Cl.
| | |
|---|---|
| *H04L 12/18* | (2006.01) |
| *H04L 51/046* | (2022.01) |
| *H04L 65/1083* | (2022.01) |
| *H04L 65/61* | (2022.01) |
| *H04L 51/52* | (2022.01) |
| *H04L 67/50* | (2022.01) |
| *H04L 51/04* | (2022.01) |

(52) U.S. Cl.
CPC ...... *H04L 12/1822* (2013.01); *H04L 12/1818* (2013.01); *H04L 12/1831* (2013.01); *H04L 51/046* (2013.01); *H04L 65/1083* (2013.01); *H04L 65/4069* (2013.01); *H04L 51/04* (2013.01); *H04L 51/32* (2013.01); *H04L 67/22* (2013.01)

(58) Field of Classification Search
CPC . H04L 12/18; H04L 12/1827; H04L 12/1831; H04L 12/185; H04L 12/1813; H04L 12/1822; H04L 51/16; H04L 51/04; H04L 51/00; H04L 65/403; H04L 67/22
See application file for complete search history.

(56) References Cited

U.S. PATENT DOCUMENTS

| | | | |
|---|---|---|---|
| 7,860,928 B1 | 12/2010 | Anderson | |
| 8,312,500 B2 | 11/2012 | Emerson et al. | |
| 2002/0085029 A1* | 7/2002 | Ghani | .................... G06Q 10/10 715/751 |
| 2003/0078972 A1 | 4/2003 | Tapissier et al. | |

(Continued)

*Primary Examiner* — Tom Y Chang
(74) *Attorney, Agent, or Firm* — Reinhart Boerner Van Deuren P.C.

(57) ABSTRACT

An interactive broadcast management system including an automatic dynamic creation of groups of online participants to form or reform chat rooms based on any one or more of: the number of people joining a sub chat room; the amount of interaction of those people; and the range of opinions of those people; and as a result of one or more of those reviews an automatic change in: the size of the chat room; ranking of people in that chat room; and the number of people to be selected from each chat room to form a pool of engaging participants.

16 Claims, 40 Drawing Sheets

(56) References Cited

U.S. PATENT DOCUMENTS

2004/0225728 A1* 11/2004 Huggins ................ H04L 29/06
709/223
2010/0017371 A1 1/2010 Whalin et al.
2014/0344718 A1* 11/2014 Rapaport ................ H04L 51/32
715/753
2015/0172227 A1 6/2015 Grove, II

* cited by examiner

50

| TOPIC | | |
|---|---|---|
| Name | Opinion | Select Person or not - if celebrity |
| | A | No |
| | A | No |
| | A+ | No |
| | B | No |
| Celebrity 1 | A | Yes |
| | B- | No |
| | B | No |
| | A | No |
| | B | No |
| | C | Yes |
| Celebrity 2 | A++ | Yes |
| | A | No |
| | B-- | No |
| | B | No |
| Celebrity 3 | A | Yes |
| | B | No |
| | C | No |
| | D | No |
| | | 15/18 = 82% ignored |

| Name | TOPIC | | Select Person - if in different region/timezone |
|---|---|---|---|
| | Opinion | Region/timezone | |
| | A | Inner Melbourne | Yes |
| | A | Vic northern regional | Yes |
| | A+ | Outer Melbourne | Yes |
| | B | Inner Melbourne | No |
| | A | Vic eastern regional | Yes |
| | B- | Outer Melbourne | No |
| | B | No | No |
| | A | Inner Melbourne | No |
| | B | Vic northern regional | No |
| | C | Inner Melbourne | No |
| | A++ | Inner Melbourne | No |
| | A | Inner Melbourne | No |
| | B-- | Inner Melbourne | No |
| | B | Vic northern regional | No |
| | A | Outer Melbourne | No |
| | B | Outer Melbourne | No |
| | C | Outer Melbourne | No |
| | D | Inner Melbourne | No |
| | | | 14/18 = 78% ignored |

| | TOPIC | | |
|---|---|---|---|
| Name | Opinion | Select Person or not - if subtle different opinion | Select Person or not - if clearly different opinion |
| | A | Yes | Yes |
| | A | No | No |
| | A+ | Yes | No |
| | B | Yes | Yes |
| | A | No | No |
| | B- | Yes | No |
| | B | No | No |
| | A | No | No |
| | B | No | No |
| | C | Yes | Yes |
| | A++ | Yes | No |
| | A | No | No |
| | B-- | Yes | No |
| | B | No | No |
| | A | No | No |
| | B | No | No |
| | C | Yes | No |
| | D | Yes | Yes ← 55 |
| | | 9/18 = 50% ignored | 14/18 = 78% ignored |

| Topic Group A | | | |
|---|---|---|---|
| Name | Op 1 | Op 2 | Op 3 |
| | A | A- | B |
| | B | B | |
| | A+ | A | A |
| | B | B | |
| | A | A | A++ |
| | B- | B | |
| | B | B- | A |
| | | | |
| 100% of opinions involved | | | |

522

| Topic Group B | | | |
|---|---|---|---|
| Name | Op 1 | Op 2 | Op 3 |
| | B | | |
| | A+ | A+ | |
| | B | B | |
| | A | A | |
| | B- | B- | |
| | B | B | |
| | A | | |
| | | | |
| 100% of opinions involved | | | |

$X_n$

| Topic Group C | | | |
|---|---|---|---|
| Name | Op 1 | Op 2 | Op 3 |
| | A | | |
| | A | C | |
| | A- | C | C |
| | A-- | | |
| | A | A | A |
| | B- | | |
| | C | C | |
| | | | |
| 100% of opinions involved | | | |

523

| Topic Group D | | | |
|---|---|---|---|
| Name | Op 1 | Op 2 | Op 3 |
| | A | | |
| | B | | |
| | A+ | | |
| | B | | |
| | A | | |
| | B- | | |
| | B | | |
| | | | |
| 100% of opinions involved | | | |

Time Line   Text of Radio Listeners          Commenting of Radio presenter

Group #    #8                3AW        Voice Commentary

3:02pm                3:02——————

Participant ID   P32           TEXT

7713AD       TEXT

2756G        TEXT

Time line

Indicator -         3:03pm                3:03——————

(This appears  8647NH       TEXT

On the

Webpage)     X234          TEXT

JK99         TEXT

3:04pm                3:04——————

TEXT, discussion of Listeners            Live Media commentary. This does
This appears on the Webpage or app    not appear on the Webpage

FIGURE 29

Group #8 case study
Live Page example

Allows people to choose their name and avatar, when they reach a page that is open...Or simply just view the conversation (Website) Text commentary  (Radio station) Voice commentary Website | Radio (Join the conversation option)

8 (topic name)                @...      3:07pm

&P32 Where I live in Melbourne, this is not a problem.  1

●7713AD Not a problem for now, but wait a few years and see what happens.  3

●2756G I am just worried about the cost of housing for our future generations  5

●JK99 It's like we are now just an international market for real-estate. Not fair on the younger people.  5

3:08pm

●2756G Maybe put restrictions on immigration to take the pressure off the competition for housing restricting immigration is a good idea. Melbourne has become too congested.  2

●8647NH Agree that something needs to be done but you have the choice to move to the country.  4

●X234 I am not interested in living in the country. The housing policy must change in Melbourne.  3

3:09pm

●X234 The transport in the city must improve and we have to plan for the increasing population.  5

(Type text here)

Website | Radio

3:07pm

3AW: "We have Brian on the line who wants to comment on overseas buyers of Melbourne real-estate. Go ahead Brian."

Guest: "Thanks for taking my call. Where I live in Glen Waverly they are out bidding everyone at actions."

3AW: "Thanks Brian, we have another caller on the line, Mandy. Go ahead."

3:08pm

Guest: "Yes thanks, I think it depends on where you live. I live in Rosebud and there is no overseas competition whatsoever."

3AW: "Thanks Mandy, well it seems that you can't make it a simple statement that overseas buyers are pushing up the prices everywhere."

Text discussion appears on the Join-In Website or app

Does not appear on website or app

OR for option for it to appear using voice to text software

FIGURE 30

OBTAINING CONTENT

A   observing content click on *P* print icon      (select from either observe or create discussion)

↓

| observe discussion | select geographical region

↓ select newspaper / magazine in region

↓ click on publication

↓ select date

| create discussion |

The Herald Sun Saturday June 7
(example)
(picture of article page 5)
(picture of article page 6)
(picture of article page 27)
(picture of article page 40)

↓ click on article page 5

↓ example of article page 5:

premier pushes ahead with sky rail text
----
----
----
TEXT

1 Red
2 Red
3 Red
4 Red

↓ inside #1 Red
JOK 20: This premier doesn't listen to public opinion
MARK 30: We need better train services, lets do it
JENNIE 44: Its going to lower hand valves in the area

FIGURE 32

THE NOTEWORTHY FUNCTION

Identifying top group opinions from amongst all the groups

The letter (N) represents noteworthy

1 Red 1740 - 1740 noteworthy clicks. This is more than Red #2 at 1270 Noteworthy clicks. The highest group TOTAL of noteworthy clicks ranks at the top.

2 Red 1270

1 Yellow 190

2 Yellow 155

Ranking example inside Red #1

```
USER      Mary19 ————TEXT————(N) 115    -2       TOTAL   1740
ID        John23 ————TEXT————(N) 105     1
          Paul11 ————TEXT————(N) 320     3
          213JK  ————TEXT————(N) 1200    5
                                    scale -5 — +5
```

Ranking example inside Red #2

```
USER      12 ———TEXT————(N) 1100   5       TOTAL   1270
ID        13 ———TEXT————(N) 110    2
          76 ———TEXT————(N) 50     1
          87 ———TEXT————(N) 10    -3
                                scale -5 — +5
```

TEXTS/COMMENTS

Total noteworthy clicks

FIGURE 34

RESPONSIVE EXCHANGE

The individual ID (MARK15) is responding directly to the comments made by the individual ID of (JOHN23). The individual represented by the ID Mark15, double clicks on John23 and then drags a copy of the ID John23 onto his line. Mark15 now directly comments on what John23 has said.

ENHANCEMENT OF THE NOTEWORTHY FUNCTION

| Block of Intensity | Colour Code | Description |
|---|---|---|
| High | Purple | • 6000 letter characters per 5 minutes<br>• High Reading Rate<br>• Reference Rate = 1200 characters typed per minute |
| Medium | Pink | • 5000 letter characters per 5 minutes<br>• Average Reading Rate<br>• Reference Rate = 1000 characters typed per minute |
| Low | Orange | • 4000 letter characters per 5 minutes<br>• Slower Reading Rate<br>• Reference Rate = 800 characters typed per minute |

FIGURE 41

INTERACTIVE BROADCAST MANAGEMENT SYSTEM

CROSS-REFERENCE TO RELATED PATENT APPLICATIONS

This patent application is a continuation of PCT/AU2017/051238, filed Nov. 13, 2017, which claims priority to Australian Application No. 2016904612, filed Nov. 11, 2016, the entire teachings and disclosure of which are incorporated herein by reference thereto.

FIELD OF THE INVENTION

The present invention relates to an interactive broadcast management system application for telecommunication devices and in particular to interactive applications for broadcast telecommunication via mobile devices.

The invention has been developed primarily for use in methods and systems for an interactive broadcast management system using chat rooms accessible via mobile devices and will be described hereinafter with reference to this application. However, it will be appreciated that the invention is not limited to this particular field of use.

BACKGROUND

Generally, in broadcasting there is the opinion given of the presenter(s). Such opinion can be informative and useful but generally only if backed up by substantial preparation and review by the presenters prior to the program being broadcast. On commercial broadcasting channels, generally, there is not the time or financial resources to allow extensive research before a broadcast.

It is therefore beneficial to make use of your audience feedback to fill that void of knowledge of the detail of various subjects that are being discussed and which are noteworthy.

In one form of this feedback is merely talkback radio in which listeners on the radio provide feedback by calling in by telephone, or SMS text messages to the presenter in live time.

If you are a regular online participant to talkback broadcast, you will notice that the talkback presenter, when discussing a particular topic, does not have enough air time to allow all the people ringing in to have their say live on air. Only a few of the callers actually get through to the presenter to have their say. The presenter continuously uses the line, "Sorry for all the callers who couldn't get through".

Other talk back stations have a mix of talkback callers and people who send in text messages. The presenter only reads a few of the text messages received as there is not enough time to read out all the messages.

If we look at FIGS. 1 to 3 there is an indication of the shortfalls of such prior art approaches.

In FIG. 6 there is shown a plurality of callers in live time with a range of opinions including A and variations such as A+ and A++, B and variations such as B− and B−−, C and D. A name can be recorded or noted alongside the opinion. However, as a selection means the presenter might merely take the opinions of celebrities or sporting stars in sports presentations. Therefore, in this approach the only opinions that get to the air are opinions A, A++, and A of celebrity 1, 2 and 3 respectively. This results in a very limited range of opinions being presented and of the 18 callers 15 are ignored resulting in 82% of the feedback being ignored.

In FIG. 7 there is shown a plurality of callers in live time also with a range of opinions including A and variations such as A+ and A++, B and variations such as B− and B−−, C and D. As well as a name being recorded or noted alongside the opinion there can be a region or district. Therefore, as a selection means the presenter might merely take the opinions of a selection from various districts. This is shown in FIG. 2 by the Yes or No selection where the next in line with different district or region is selected. Therefore, in this approach the only opinions that get to the air are opinions A, A+, of the first call-back callers from the different regions of Inner Melbourne, Victoria northern regional, Outer Melbourne, and Victoria Eastern regional. All of the other opinions from those regions are ignored. This results in a very limited range of opinions being presented and of the 18 callers 14 are ignored resulting in 78% of the feedback being ignored.

Even if the presenter tries to take a selection of opinions in live time this is extremely difficult due to possibly 50 or 100 callers and the fast rolling screen. However, in this case such as shown in FIG. 3 there are still substantial drawbacks.

In FIG. 8 the opinions can a range of opinions including A and variations such as A+ and A++, B and variations such as B− and B−−, C and D. The presenter could take the first caller with opinion A and therefore present that opinion. The presenter will then not present others with opinion A or variations such as A+. However, the presenter could present opinion B, C and D. This does mean a range of opinions could now be presented. However, the further callers with opinion A or A+ will be ignored. This means that the prevalence of that opinion is not known, or the subtlety or great breadth of differences is not known. Another major fault is that it matches up the importance of one opinion A to be as important as prevalent and as worthwhile as opinions B, C or D even though 8 of the 18 callers believe in opinion A or variations and only 1 of the 18 has opinion D. Further overall there is still the total ignoring of 14 of the 18 or 78% if subtle differences of opinion are not taken into account or at least 50% ignored if the presenter is able to work so efficiently as to understand subtleties of opinions and present those opinions.

Clearly there is needed a better and more in-depth way of interacting with beyond what is currently offered by, for example telephone, or SMS text messages or Twitter™.

Any discussion of the background art throughout the specification should in no way be considered as an admission that such background art is prior art nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents forms part of the common general knowledge in the art, in Australia or in any other country.

SUMMARY OF THE INVENTION

It is an object of the present invention to overcome or ameliorate at least one or more of the disadvantages of the prior art, or to provide a useful alternative.

In accordance with the invention there is provided an interactive broadcast management system including an online interactive interface accessible by at least one user and a plurality of online participants; a server having the necessary applications and databases for operating the system; at least one communication means being selectively connected between said user(s) and a selected one of said online participants(s); at least one interactive tool for assessing the online participant to be selected for engaging by said user(s); at least one feedback tool accessible by the at least one user for monitoring online participants interest of the plurality of online participants; and at least one selection tool whereby the interactive broadcast management system provides an online control panel for managing and automating online participants interaction/relationships with a broadcaster and/or broadcasting channel.

The invention in one form provides a method of interactive broadcast management using an interactive broadcast management system including an online interactive interface accessible by at least one user and a plurality of online participants; a server having the necessary applications and databases for operating the system; at least one communication means being selectively connected between said user(s) and a selected one of said online participants(s); at least one interactive tool for assessing the online participant to be selected for engaging by said user(s); at least one feedback tool accessible by the at least one user for monitoring online participants interest of the plurality of online participants; and at least one selection tool whereby the interactive broadcast management system provides an online control panel for managing and automating online participants interaction/relationships with a broadcaster and/or broadcasting channel.

The method can include the automatic undertaking of a number of reviews and then automatically acting on those reviews to alter how the system then proceeds wherein the reviews include any one or more of:
 the number of people joining a sub chat room;
 the amount of interaction of those people; and
 the range of opinions of those people;
and as a result of one or more of those reviews an automatic change in:
 the size of the chat room;
 ranking of people in that chat room
 the number of people to be selected from that chat room rather than other chat rooms
wherein the system is linked to at least one other broadcast station in a networked environment in a manner designed to integrate users and online participants via online and standard communication methods and wherein the method allows interactive broadcast management to provide an online control panel for managing and automating online participants interaction/relationships with the broadcaster and/or the broadcasting channel.

The method can further include an automatic dynamic management of groups of online participants to form or reform chat rooms in real time based on any one or more of:
 the input rate of participants observed by detecting inputting typing character rate of participants;
 the amount of interaction of the participants such that they are deemed active; and
 the speed of reading rate by participant of comments of other participants observed by detecting scrolling by the reading participant;
and as a result of one or more of those reviews an automatic change in:
 the interaction rate of participants in a chat room to maintain active participants;
 the size of the chat room;
 the matching of participants by matching reading rate of participants to input rate of participants;
 the expansion, contraction or merger of participants or content in chat rooms.

Preferably the system is linked to at least one other broadcast station in a networked environment in a manner designed to integrate users and online participants via online and standard communication methods.

The system can have a first interactive tool is a topic enquiry tool which enables online participants to ascertain information pertaining to a current topic being broadcast.

Preferably a user can view what topics have been inquired and when the Inquiry was made to determine which topics have been queried within specific time periods to gain information regarding opinion interaction of online participants preferences.

The system can have a second interactive tool is a topic allocation tool which allows online participants to request topics to be broadcast.

Preferably the topic allocation tool is programmed to send an automated message back to the online participants to provide confirmation that the request has been received by the broadcaster.

The system can have a third interactive tool is preferably a limited sizing chat room tool which allows limited predefined number of online participants to engage in real time online conversations with each other for review by the broadcaster.

An interactive broadcast management system according to claim 1 where a fourth interactive tool is a selection tool which enables online participants to provide a feedback directed to another online participant's opinion or comment.

Preferably the fourth interactive tool includes an initial rating of the online participant's opinion or comment and the provided feedback directed to another online participant's opinion or comment is reflected in the participant's modified rating of opinion or comment wherein the development of the opinions is viewable to provide the user with a range of modified ratings and therefore development of the topic and interaction of all online participants in that chat room.

The rating can be provided by one or more of the following feedbacks from online participants in that group or by observers:
 Noteworthiness
 Categorisation of opinion
 Agreement with opinion
 Change of opinion
wherein the display of opinions or comments and related rating associated with an online participant is shown in the online interactive interface for use in broadcasting.

Preferably the communication can be made via the internet or any other standard communication means such as phone, email, digital telecommunication or the like.

The interactive broadcast management system can have a recorded communication given an opinion code attached to indicate the opinion or comment on the topic or content of the communication.

The first feedback tool is preferably a noteworthy tool which is adapted to run at least one poll whereby online participants can respond to at least one question or topic or the like nominated by the announcer and announced on-air/via the website.

The second feedback tool is preferably an interaction tool that allows online participants to vote for a topic currently playing on-air.

The information obtained from the feedback tool(s) can be used to compile charts, report and other information to indicate user interest.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

The invention also provides a method of interactive broadcast management including the automatic undertaking of a number of reviews and then automatically acting on those reviews to alter how the system then proceeds wherein the reviews include any one or more of the number of people joining a sub chat room, the amount of interaction of those people, and the range of opinions of those people, and as a result of one or more of those reviews an automatic change can occur in: the size of the chat room; ranking of people in that chat room and the number of people to be selected from that chat room rather than other chat rooms.

In summary this concept competes with a market segment currently predominantly occupied by Facebook™ and Twitter™. The ability to respond to another person comments, creates an interesting exchange of views which will lead to repeat visits by individuals whether to just observe discussion groups or participate in group discussion. It is also a vehicle to enable people to have a new insight into what others are thinking about with regards to different topics and issues.

It is believed this invention provides effective improvements and alternatives to feedback systems such as on Facebook™ and Twitter™. One element of the uniqueness of the concept includes its focus on the structured formation of groups whilst interacting with Live Media. It makes for a dynamic exchange of views within each social group. This is a more sophisticated version compared to the Twitter™ hash tag (#) or a media company's Facebook™ page.

A uniqueness of the concept is in its focus on the structured formation of groups whilst interacting with the LIVE media. It makes for a dynamic exchange of views within each social group. There are two types of users and are as follows:
 a. Participant
 b. Observer The ability to respond to another person's comments, creates an interesting exchange of views which will lead to repeat visits by individuals whether to just observe discussion groups or participate in a group discussion.

Every person has different reading abilities. Some of them are fast readers whilst others are slower. This document details the mathematical based 'Reading Rate Automation' which enhances the observer with rich interactive experience and high-performance standard.

A fundamental purpose of this concept is to present a feature of the web application/mobile application that will be dynamic and engaging. Periods of inactivity in the comments of the participants are overcome by auto re-organising the participants comment to keep the conversation flowing at the predetermined reading speeds of high, medium and low for the Observer.

Other benefits and understanding of the invention will become further shown in the following description.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIG. 6 shows a listing of listeners calling to a station and being listed and ranked for use in accordance with a version of the prior art in which persons are selected if celebrity;

FIG. 7 shows a listing of listeners calling to a station and being listed and ranked for use in accordance with a version of the prior art in which persons are selected if from different regions of the listening area;

FIG. 8 shows a listing of listeners calling to a station and being listed and ranked for use in accordance with a version of the prior art in which persons are selected if different opinion;

FIG. 10 is a general outline of different sub chatrooms being controlled so as to be used in the control, listing and automatic selection of callers in accordance with an interactive broadcast management system in accordance with an embodiment of the present invention;

FIGS. 26 to 30 are exemplary forms of the functional relationships and screen shots of the interactive broadcast management system in accordance with an embodiment of the present invention;

FIGS. 31 to 33 are diagrammatic views of a controlling system used in the control, listing and automatic selection of callers in accordance with an interactive broadcast management system using print media of newspapers published offline or online in accordance with an embodiment of the present invention;

FIGS. 34, 35 and 36 are exemplary forms of a noteworthy review mechanism, responsive exchange mechanism and an enhancement of the noteworthy function in the control, listing and automatic selection of callers in accordance with an interactive broadcast management system using media published offline or online in accordance with an embodiment of the present invention;

FIGS. 37 to 42 are diagrammatic views and screen shot of exemplary forms of a reading rate algorithm management for use in accordance with an interactive broadcast management system using media published offline or online in accordance with an embodiment of the present invention.

DETAILED DESCRIPTION OF EMBODIMENT OF THE INVENTION

Figure 1:
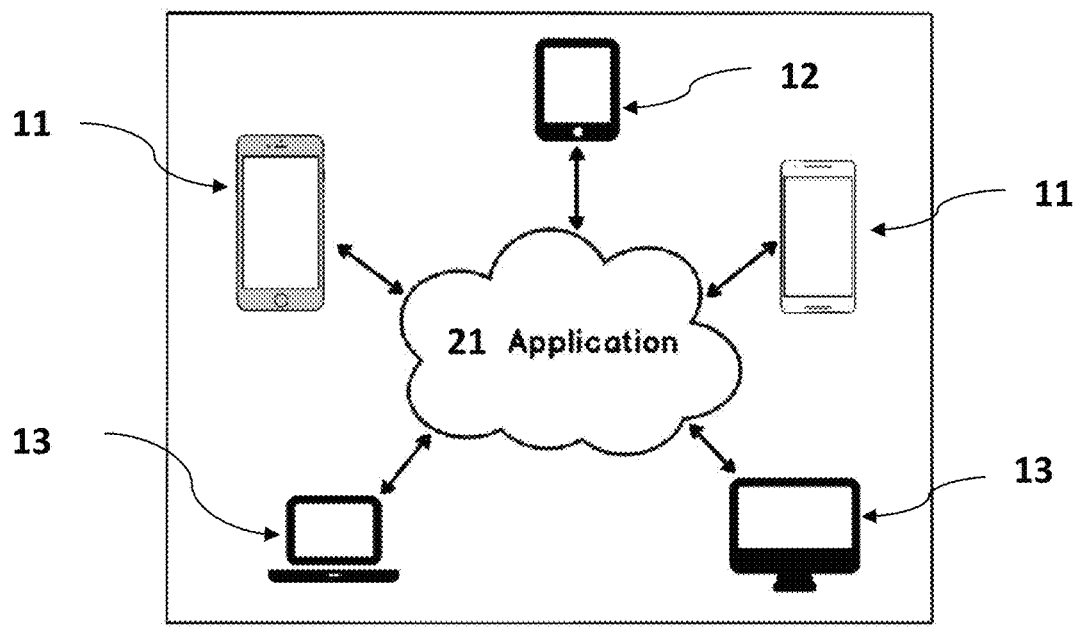
FIG. 1 is a diagrammatic view of components of the interactive broadcast management system of an embodiment of the invention and in particular to a digital communication feedback and content creation portion for use in a broadcast system.

It should be noted in the following description that like or the same reference numerals in different embodiments denote the same or similar features.

Referring to FIGS. 1 to 5 there is shown the general outline of the of components of the interactive broadcast management system of an embodiment of the invention and in particular to a digital communication feedback and content creation portion for use in a broadcast system. In particular the digital communication of the broadcast listeners can be on their mobile telephones 11 or tablets 12 or computers 13 back through the controlling app 21 to the broadcaster.

As detailed before, the usual system results in the prior art of FIGS. 6 to 8, in which there is a non-representative sample of opinions and callers put to air. This continues the narrow self-interested control of opinions rather than being able to access and view and use in real time the new content and opinions of a wide range of callers to a broadcaster. Only through this system is this capability possible.

Figure 2:
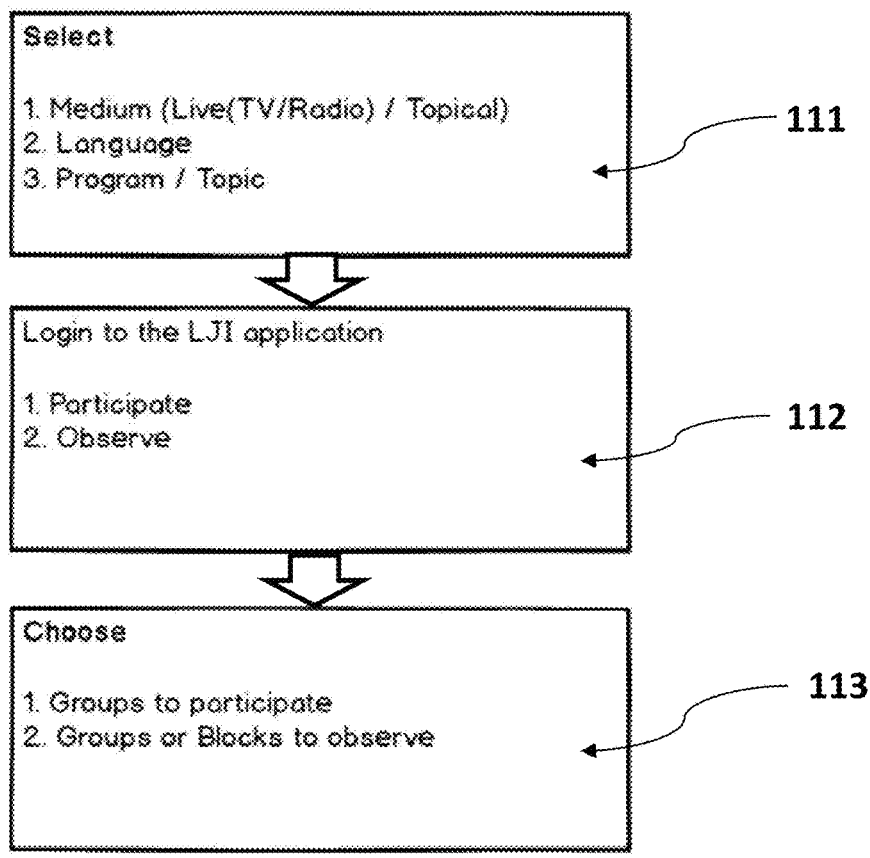
FIG. 2 is a general structural step of the method of an interactive broadcast management system according to the invention and the ability through the app to participate in digital communication feedback and content creation portion for use in a broadcast system.
Figure 3:
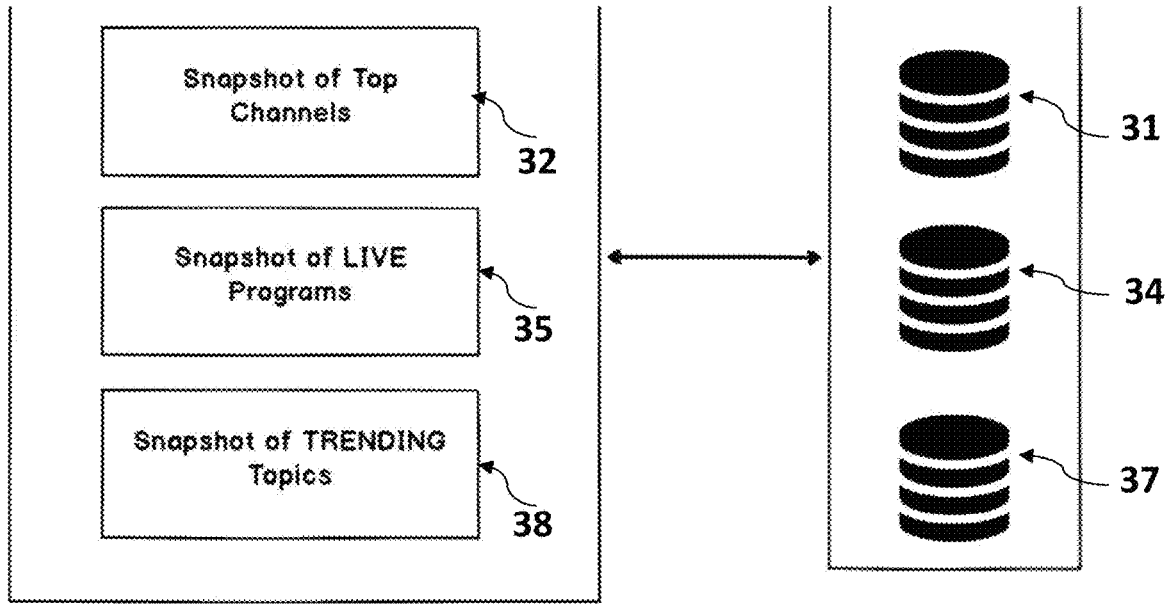
FIGS. 3 and 4 are modifications of processing in the interactive broadcast management system of an embodiment of the invention to provide the feedback and content creation portion for use in a broadcast system and in particular to display in usable form to the user of the broadcast system.
Figure 5:
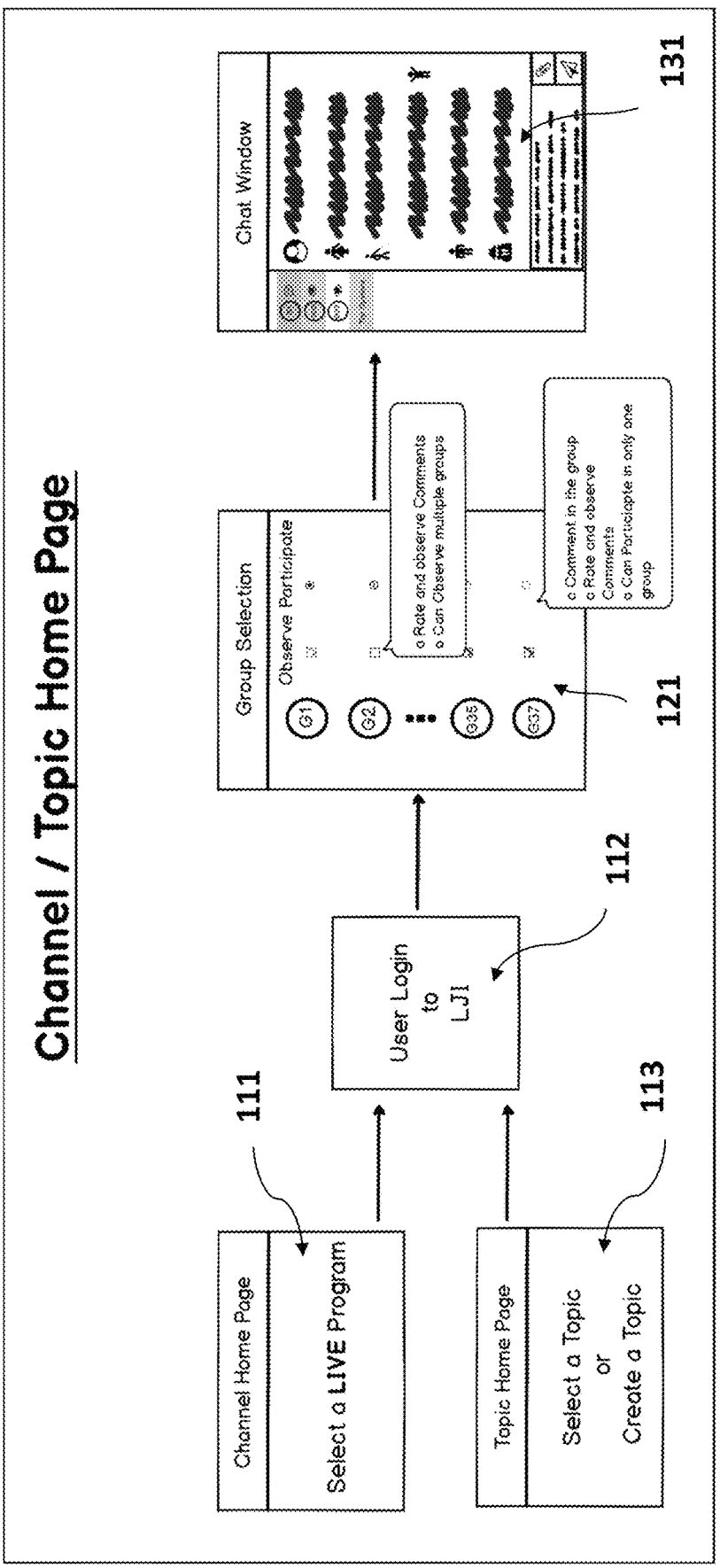
FIG. 5 is a general diagrammatic flow of the method of an interactive broadcast management system according to the invention and the ability through the app to participate in digital communication feedback and content creation portion for use in a broadcast system.

Referring to FIGS. 2 and 5, the feedback or content creator through the app 21 comprises the step of selecting the broadcaster in step 111 which can be in three elements. First choosing the medium such as live television or radio and topical programs. The second basis is choosing language while the third is in selecting the program or topic on the live television or radio that you wish to be involved.

After that selection Step 112 requires the user to login in order to participate or merely to observe. When in the system it is then necessary in Step 113 to choose the groups to participate in or the groups or blocks to observe.

Figure 4:
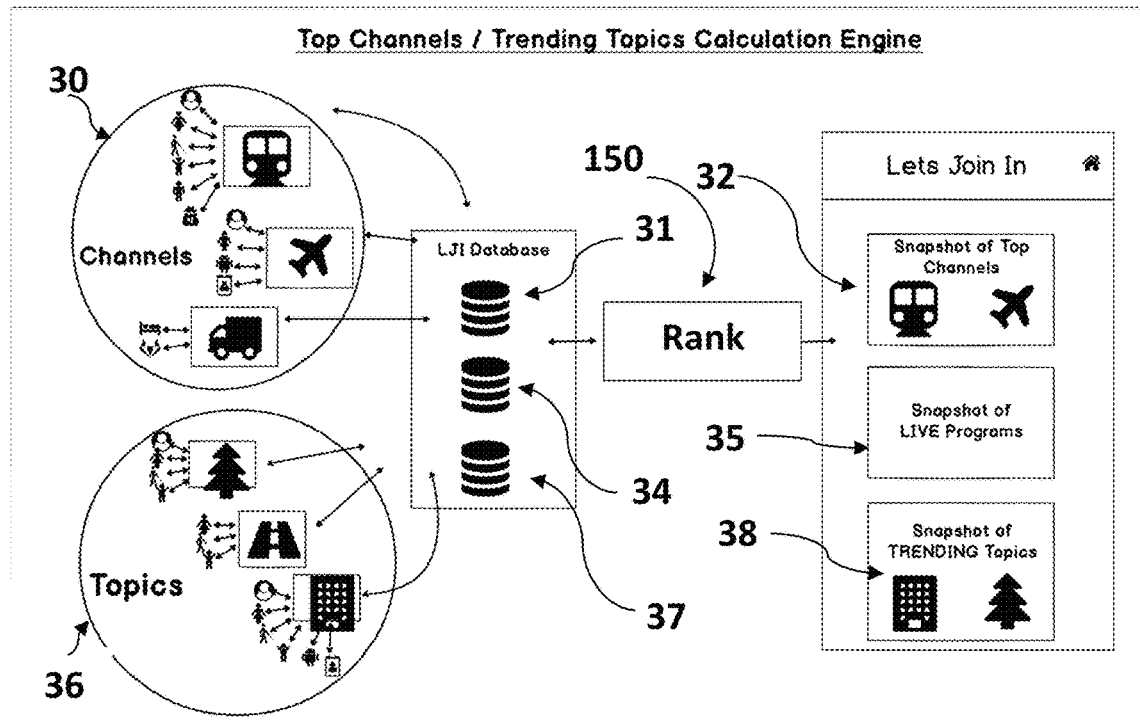

FIG. 4 identifies the general output to be provided to the broadcaster. The relevant databases 31, 34, 37 have collected in real time opinions, callers, statistics and developed conversations with the participants to develop the topic, opinions or feedback or even to create content. This is presented to the broadcaster for their use as:

a snapshot of top channels 32 in the sense of quantity and quality, content and developments of feedback;

a snapshot of live programs 35 in the sense of quantity and quality, content and developments of feedback;

a snapshot of trending programs 38 in the sense of quantity and quality, content and developments of feedback.

As shown in general in FIG. 4, channels of communication 30, and topics 36 are selected and gathered in databases 31, 34, 37 and then ranked to provide the snapshots of top channels 32, live programs 35 and trending topics 38.

Figure 9:
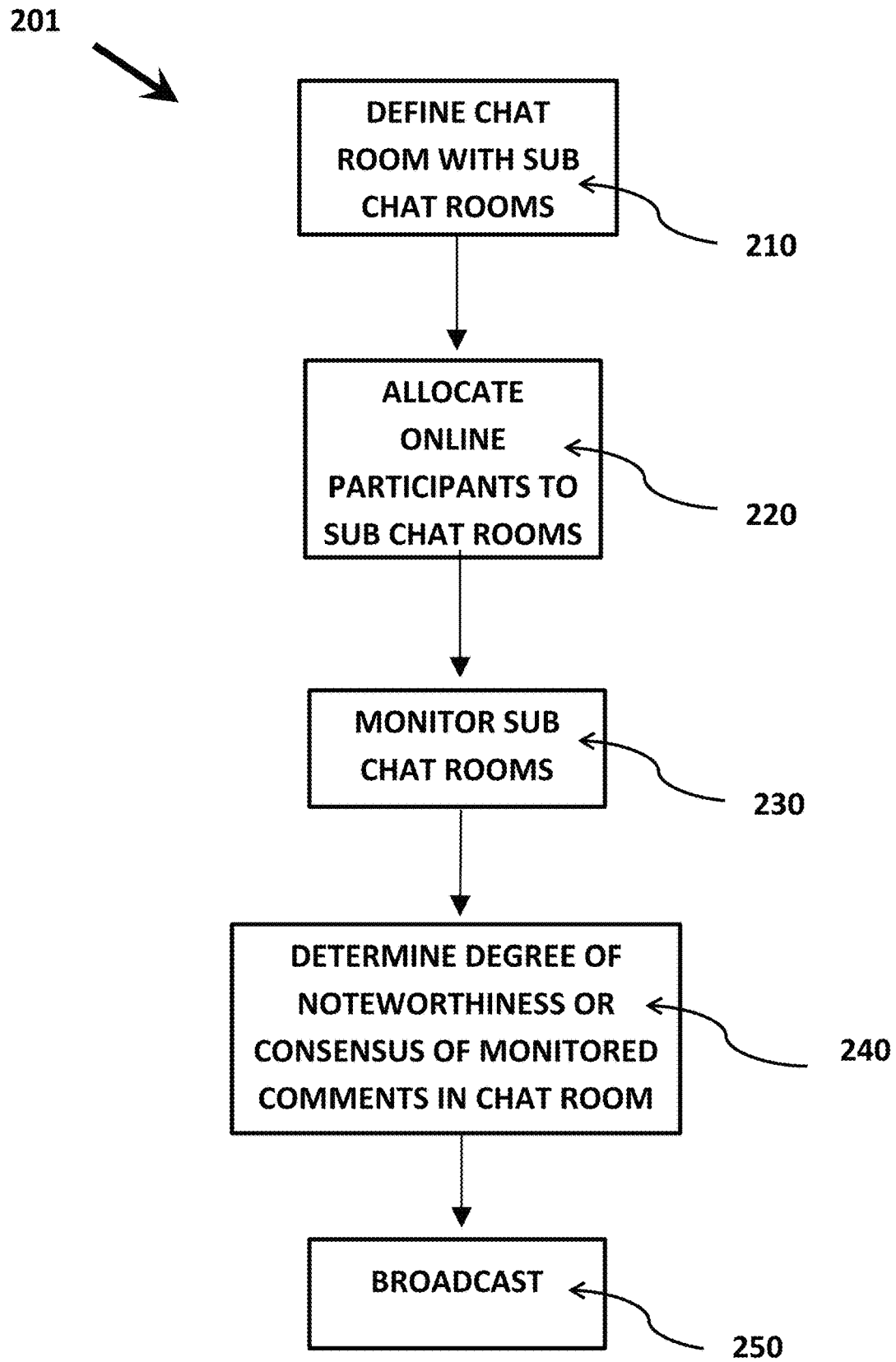
FIG. 9 is a general flow diagram of control, listing and automatic selection of callers in accordance with an interactive broadcast management system in accordance with an embodiment of the present invention.

However an embodiment of the invention employs a substantial improvement in which, referring to FIG. 9, there is shown a method of interactive broadcast management 201 including the automatic undertaking of a number of reviews and then automatically acting on those reviews to alter how the system then proceeds. The system 201 starts with the step 210 of defining the chat rooms into sub chat rooms of certain size 521, 522, 523, 524 and then in step 220 having a plurality of online participants 501, 502, 503, 504, 505 and 506 select or allocate to one of the sub chat rooms of certain size 521, 522, 523, 524.

In step 230 there is the inclusion of details of the online participants 501, 502, 503, 504, 505 and 506 the opinions, the feedback, the amount of interaction between participants, the development of the opinions. These can be automatically tracked or tagged in real time to allow automatic monitoring in step 240 so as to provide a display which involves a plurality of opinions and feedback of the participants and the amalgamation or interaction of the opinions or feedback of the entire sub chat rooms so that not just selective feedback occurs of a small percentage but feedback of a large percentage. This display can then be used for broadcasting this feedback in step 250.

As shown by FIG. 10, in which general outline of different sub chatrooms are being monitored so as to be used in the control, listing and automatic selection of callers in accordance with an interactive broadcast management system in accordance with an embodiment of the present invention. The reviews include any one or more of:

the number of people joining a sub chat room;

the amount of interaction of those people; and the range of opinions of those people;

For example, in Group A there are two major different opinions A and B but there are subtle variations A+ and B−. By continued interaction in the chat room some opinions change such as first participant goes from A to A− to B. Therefore, the feedback is a developed feedback by the interaction. Another goes from A to A++ and therefore has moved further away. This display can provide indication of the development and interaction of opinions such that a selection of comments or callers for feedback on the broadcast will provide a broader interaction opinion affected by the whole group. In effect 100% of opinions are considered.

In Group B there are similar opinions, but the group of participants stick to their opinions. This is important to note that they are not swayed by the interaction. Again, therefore in effect 100% of opinions are considered.

In Group C there is a wider range of opinions A, B C with subtleties. However, through interaction it is noted that one participant dramatically changes opinion from A– to C while another participant steadfastly remains with opinion A and another does not further interact but remains at A– –. More information is therefore achieved by interaction and selection from this monitored feedback allows in effect 100% of opinions are considered.

In Group D there is shown that no interaction occurs, but this in itself shows that opinions are not shifting and in effect 100% of opinions are considered.

As a result of one or more of those reviews an automatic change can occur in:
  the size of the chat room;
  ranking of people in that chat room
  the number of people to be selected from that chat room rather than other chat rooms.

In accordance with an embodiment of the invention there is provided an interactive broadcast management system including an online interactive interface 510 accessible by a user and a plurality of online participants 501, 502, 503, 504, 505 and 506; and a server having the necessary applications and databases for operating the system with at least one communication means being selectively connected between said user('s) and a selected one of said online participants(s). Unless clear from the context, the term broadcast means an open-ended transmission such as, for example, a television, radio, or internet message, that has, to at least some extent, an open-ended audience. The term broadcaster refers to a person or entity responsible for making such a broadcast.

Figure 11:
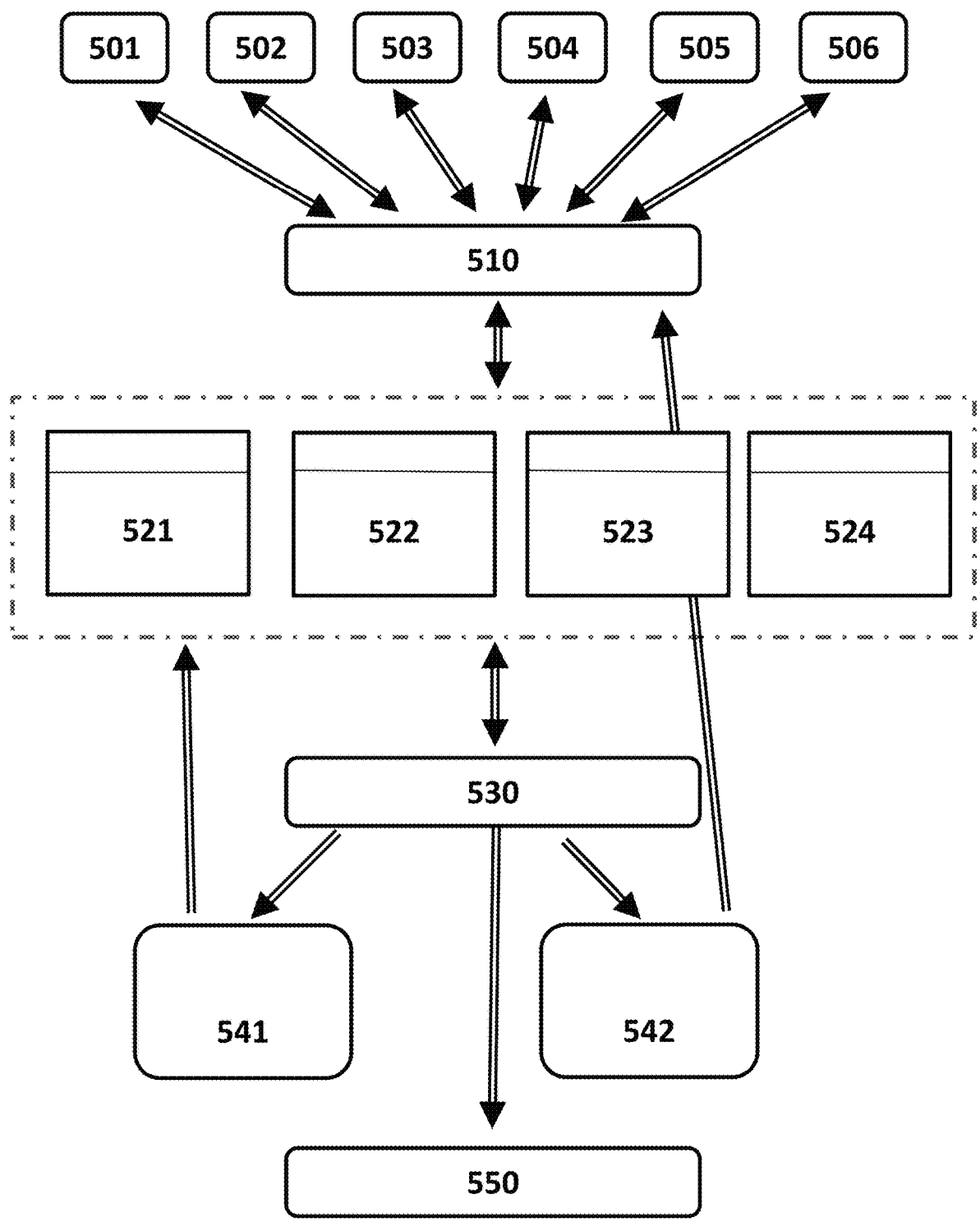
FIG. 11 is a general diagrammatic view of the telecommunication and control between entities in a control, listing and automatic selection of callers in accordance with an interactive broadcast management system in accordance with an embodiment of the present invention.

Referring to FIG. 11 there is shown an interactive broadcast management system for use with broadcast from radio or television and in which there will be a feedback such as a selection of users to be heard in real time within the program. It is therefore necessary to have an immediate and urgent system that allows this substantially real-time feedback.

The system of the invention in this embodiment has an online interactive interface 510 accessible by at least one user and a plurality of online participants 501, 502, 503, 504, 505 and 506. The interface interacts with a server having the necessary applications and databases for operating the system.

The interface 510 allows selective connection by the at least one communication means to chat rooms 521, 522, 523, 524. There is selective connection between said user(s) 501, 502, 503, 504, 505 and 506 and a selected one of said chat rooms 521, 522, 523, 524 based on seeing how each chat room is proceeding. The chat rooms can expand such as shown in FIG. 11.

With the at least one interactive tool 530 for assessing the online participant to be selected for engaging by said user(s). This assessment is listing and coding of the opinions, the feedback, the amount of interaction between participants, the development of the opinions. These can be automatically tracked or tagged in real time to allow automatic monitoring so as to provide a display 550 which involves a plurality of opinions and feedback of the participants and the amalgamation or interaction of the opinions or feedback of the entire sub chat rooms so that not just selective feedback occurs of a small percentage but feedback of a large percentage.

There is at least one feedback tool 541, 542 interacting with the interactive tool 530. One feedback tool can by assessment provide feedback updates and information and displays to the chat rooms 521, 522, 523, 524 so that further interaction and development of opinions occurs, The second feedback tool 542 can be a feedback directly back to the interface accessible by the at least one user 501, 502, 503, 504, 505 and 506 for monitoring and providing feedback to the online participants interest of the plurality of online participants so that the selection of the t least one user 501, 502, 503, 504, 505 and 506 to the chat rooms 521, 522, 523, 524 of interest can be selected or allocated.

Through this at least one interactive tool 530 for assessing the online participant to be selected for engaging by said user(s) and providing an output to the at least one selection tool 550 whereby the interactive broadcast management system provides an online control panel for managing and automating online participants interaction/relationships with a broadcaster and/or broadcasting channel. The selection tool 550 can provide displays and output like displays 521, 522, 523, 524 of FIG. 10 and interactive tools and ranking points etc. In one version there can be a traffic light selection system.

Figure 12:
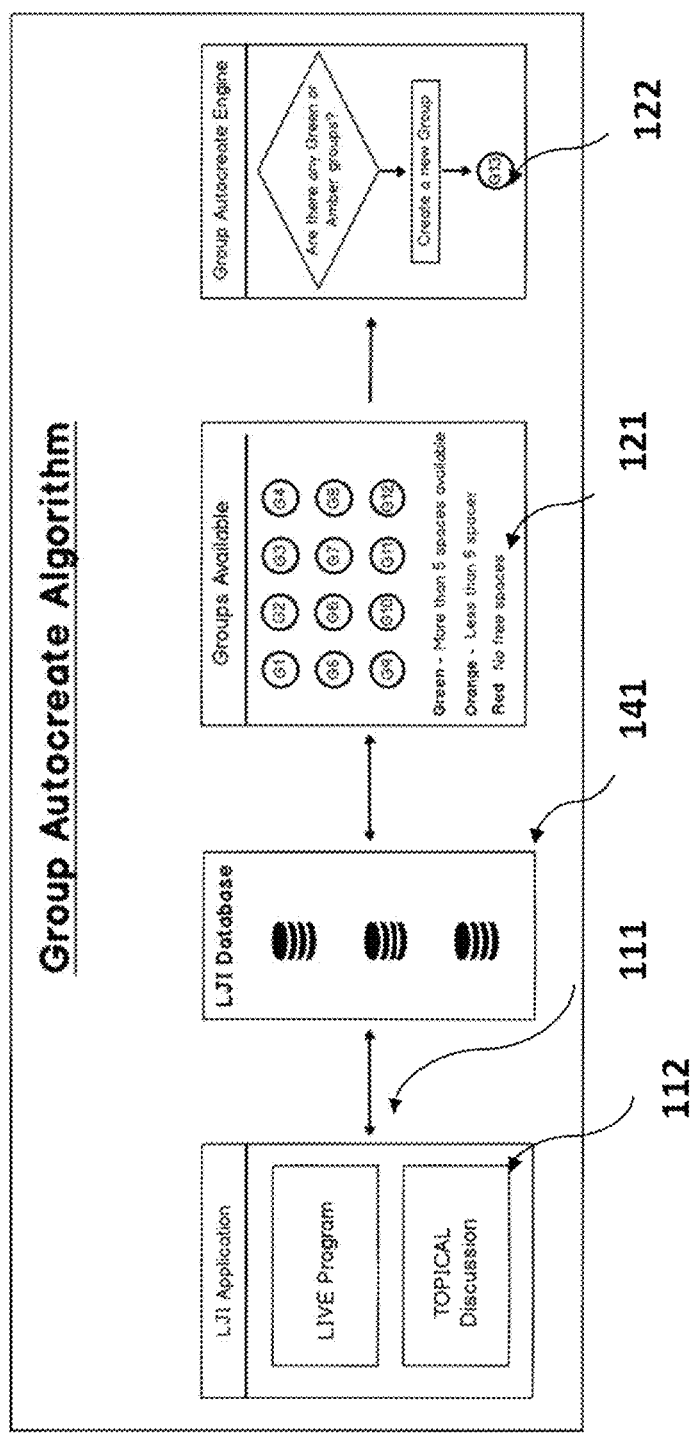
FIGS. 12, 13, 14 and 15 are diagrammatic views of various stages of the group creation, and opinion algorithm providing a usable viewable observable opinion for use in accordance with an interactive broadcast management system in accordance with an embodiment of the present invention.

Referring to FIGS. 12 to 15 there is shown that an element of the structure is the creation of groups. FIG. 12 shows that the user/contributor accesses and selects live program 111 and topical discussion 112 and information is fed to the databases 141. The groups available are shown 121 and there is the selection of green if there are more than 5 spaces available or amber/orange if 1 to 5 space or red if no spaces. Therefore, auto-selection can review green and amber groups and if necessary automatically create a new group 122.

Figure 13:
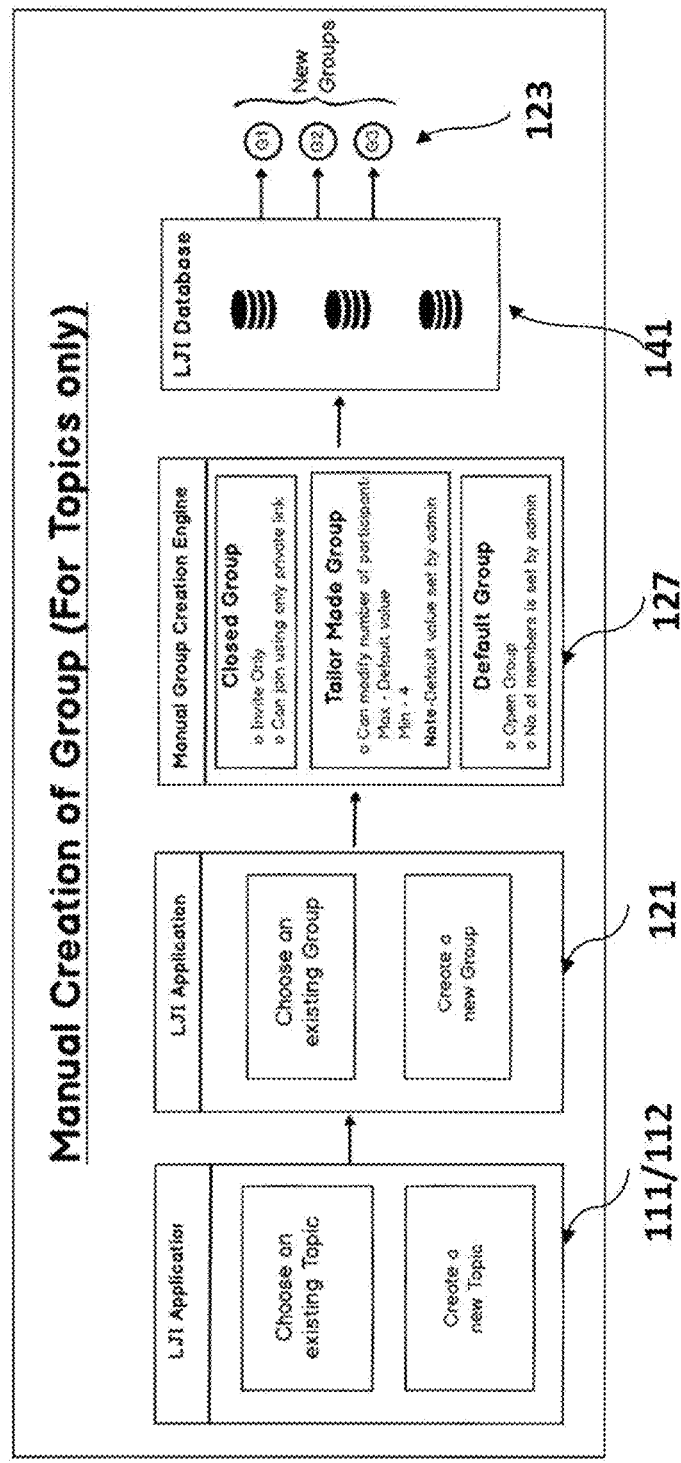

As shown in FIG. 13 there can be the manual creation of topics. This is used when the broadcaster wishes to develop a particular topic and to drill into that topic. There can be a set of subtopics that are all of interest and therefore instead of having single group there can be multiple groups manually created. This involves the usual steps of a user engaging through the app and choosing an existing topic or creating a new topic 111/112 and then choosing an existing group or creating a new group 121.

However, it further includes the step of having a manual group creation engine 122 in which there is the automatic creation of a closed group in which the users need to be invited, or you need to have a preauthorised private link. In this way a selection of well credentialed or previously shown good contributors can be included in a special topic. For example, astronauts or scientists on space advancement discussion topics or medical research on medical advancements etc.

It also can be a manual option to create a tailor-made group by predefining number of contributors that can join a group, or a default number or 4. Clearly the limiting of the number of contributors can be a positive or negative. If you have enthusiastic contributing users providing quality feedback then the discussion in a limited group such as four can help and allow the interactions to quickly develop and to get to deeper parts of the topic that is then more readily available for selection by the broadcaster for use in broadcasting. To the contrary if you have preselected a number in the group, it might be found that quickly all four agree and no longer discuss or interact and therefore the manual group creation engine is used sparingly and with good reason instead of the usual approach.

Figure 14:
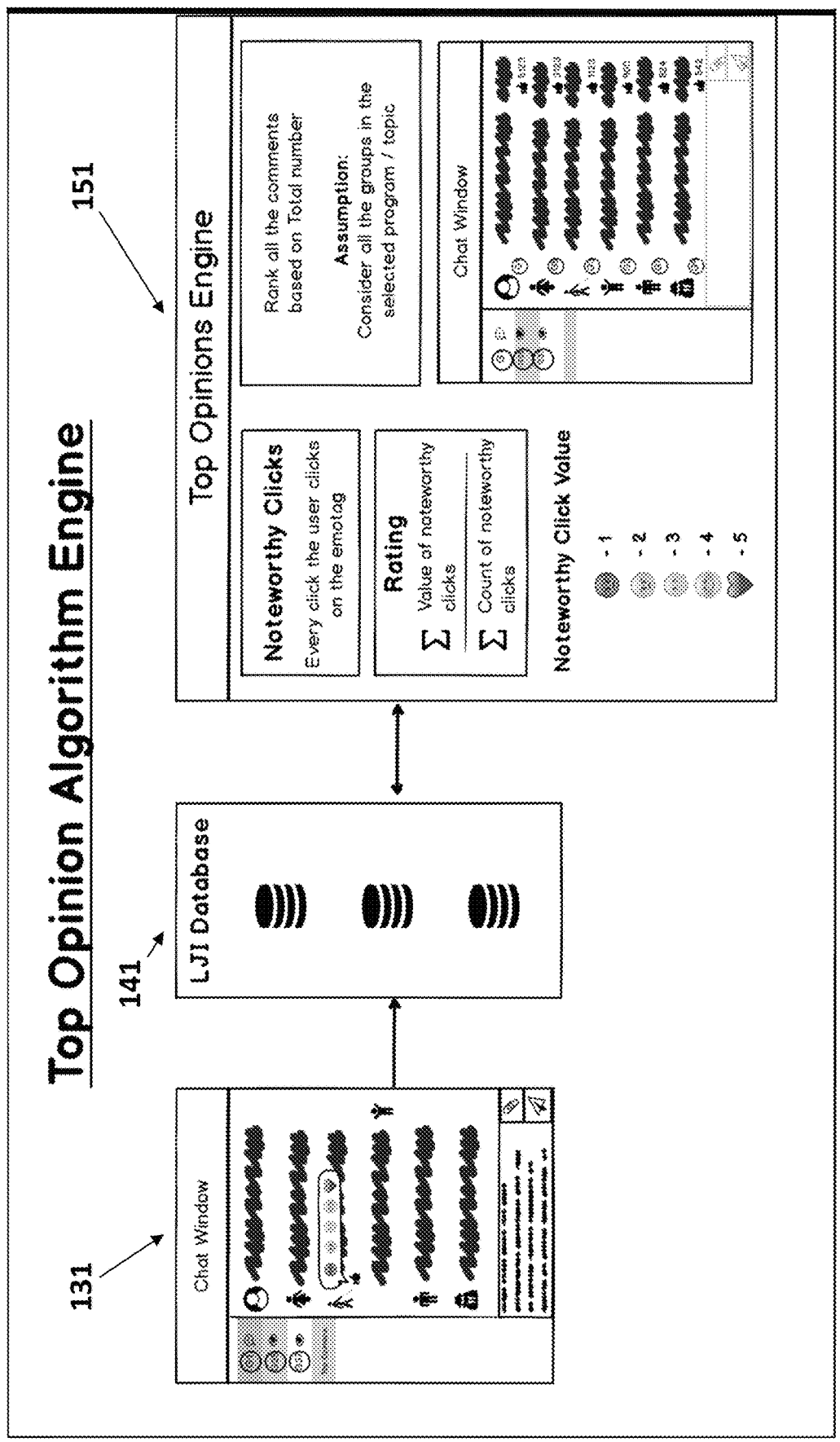

As shown in FIG. 14 from the group creation of FIG. 5 or 12 the chat rooms are created with the number of participants and the comments and interactions proceed from the chat windows to the databases. It is then analysed in real time so as to determine the noteworthiness and provide a display of the chatroom to the user broadcaster for review. The input can occur by the contributors in the chat room allocated a rating to the comment in their chat room by inclusion of a noteworthy click value of 1 to 5. The opinions are thereby automatically collated by the number of noteworthy clicks and rated by the sum of the value of noteworthy clicks over the sum of the count of noteworthy clicks. For example if four contributors rank a comment with a 5 the ranking would be 20/4=5. If one ranked it a 2, another a 5, another 1, and another 3 then the ranking would be 11/4=2.75. The ranking can then be used to organise the comments from one or more chat rooms into a collated and ranked list of chat room comments for use by the broadcaster. Overall there has been a wide review of comments and not a limitation by other than noteworthiness.

Figure 15:
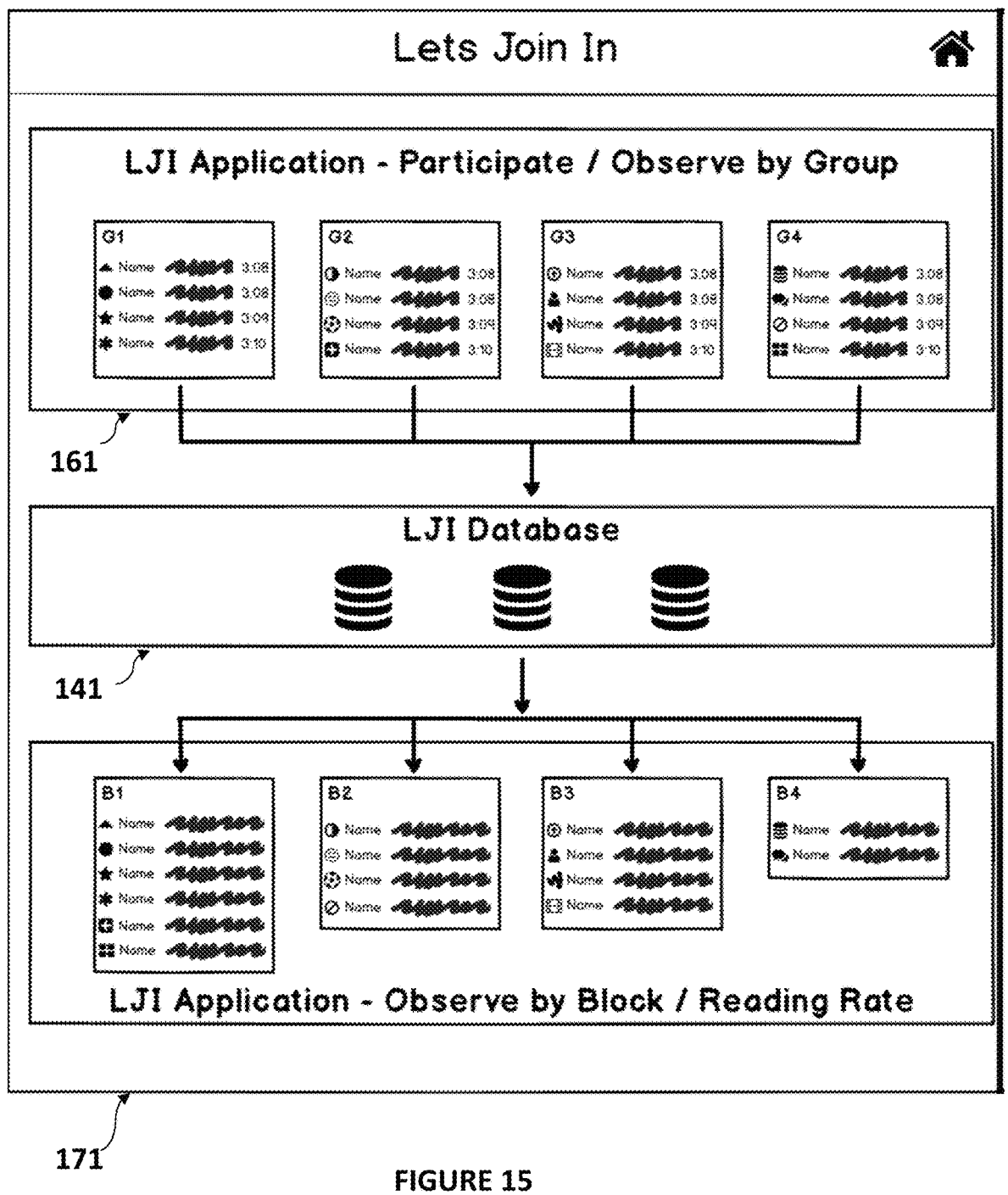

FIG. 15 shows an important element of the display of the comments for use by the broadcaster. Clearly there is a visual limit to interpretation of results. The usual method is to have all results and have a continuous scroll. However there is a physical limitation to reading rates. It is not advantageous of a system if all opinions are reviewed but due to the poor display there is merely an incapability sensor of review and it immediately returns to a lottery system of results for use. By the ranking and interaction scores a particular collection of groups G1, G2, G3 or G4 can be displayed and reviewed. In another form the groups Referring to FIGS. 16, 17, 18 and 19, 20 there are shown a plurality of sub-processes of the system.

Figure 16:
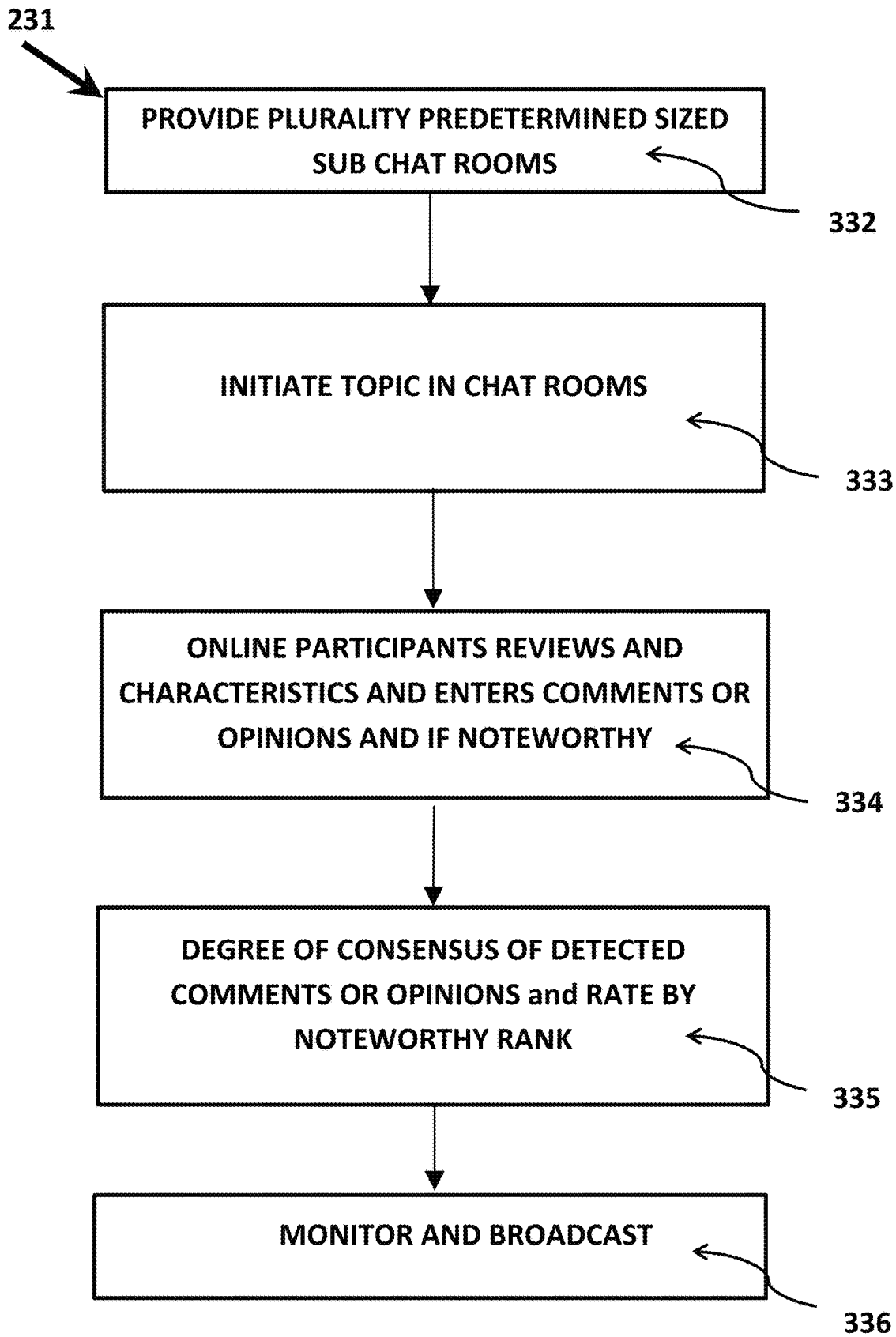
FIG. 16 is a diagrammatic flow diagram of a sub-process of selection of sub chat rooms, management and review of noteworthy rank of callers in accordance with an interactive broadcast management system in accordance with an embodiment of the present invention.

FIG. 16 is a diagrammatic flow diagram of a sub-process of selection of sub chat rooms, management and review of noteworthy rank of callers in accordance with an interactive broadcast management system in accordance with an embodiment of the present invention.

Figure 17:
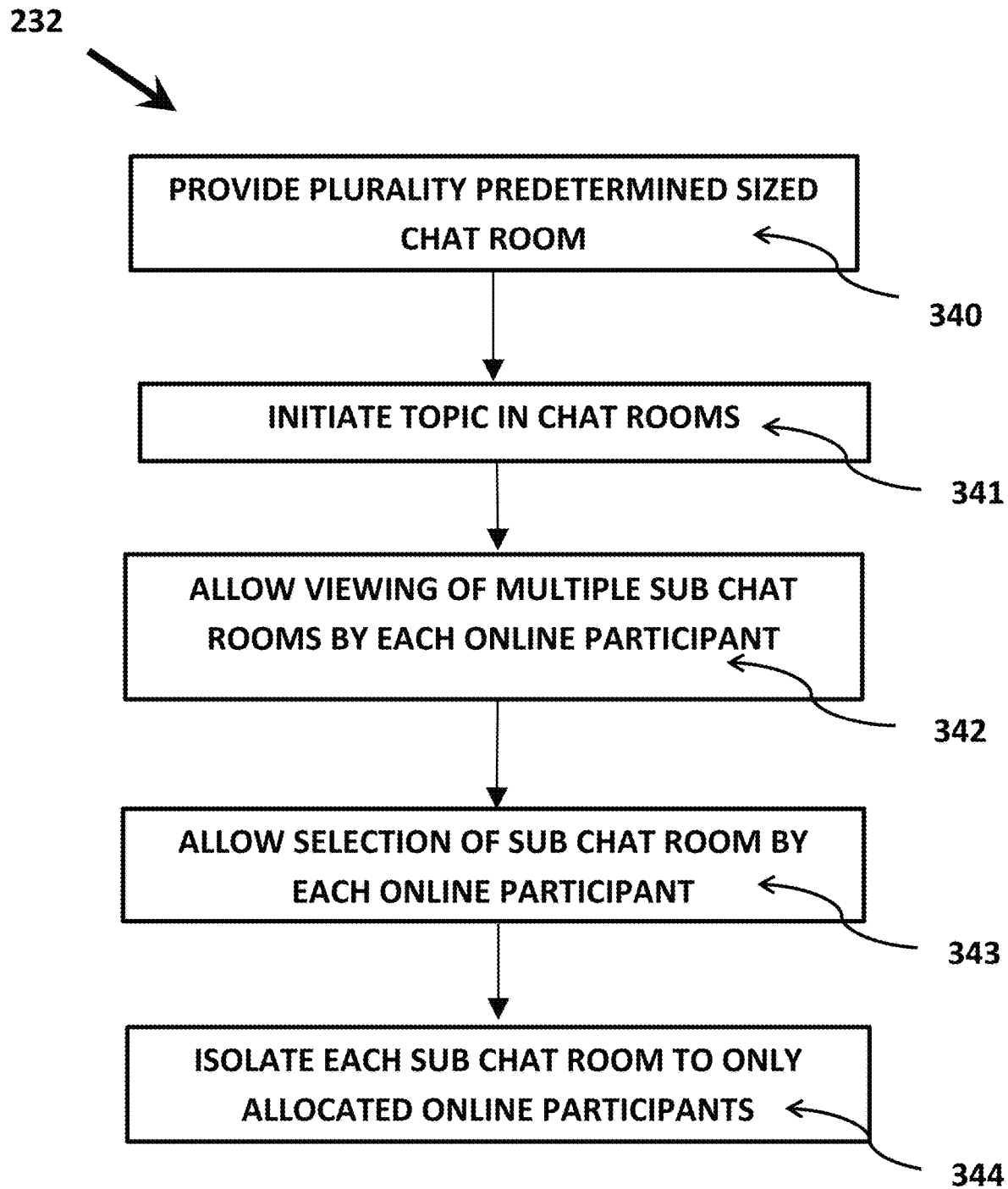
FIG. 17 is a diagrammatic flow diagram of a sub-process of maintenance and sizing of sub chat rooms in a control, listing and automatic control of callers to particular sub chat rooms in accordance with an interactive broadcast management system in accordance with an embodiment of the present invention.

FIG. 17 is a diagrammatic flow diagram of a sub-process of maintenance and sizing of sub chat rooms in a control, listing and automatic control of callers to particular sub chat rooms in accordance with an interactive broadcast management system in accordance with an embodiment of the present invention.

Figure 18:
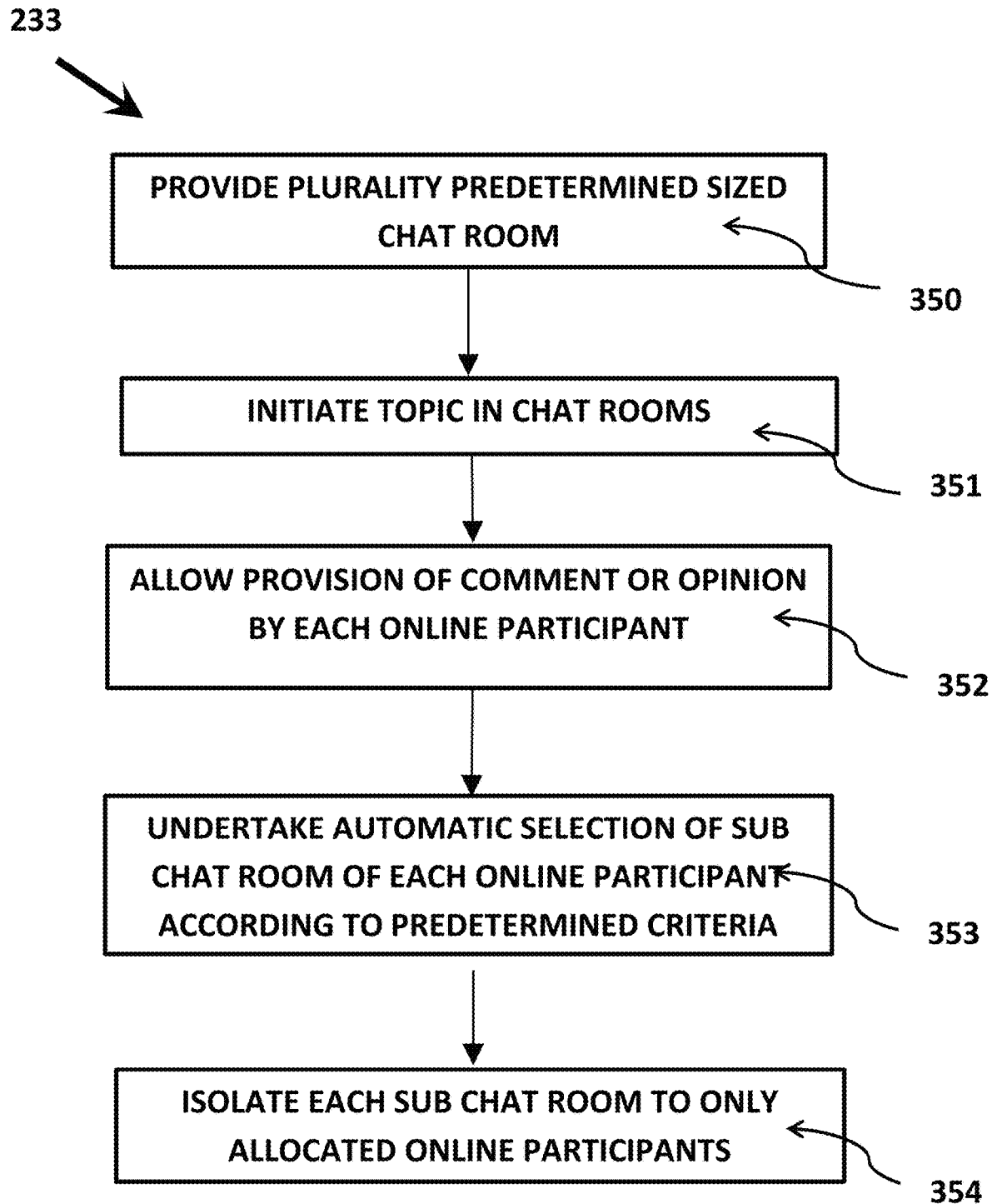
FIG. 18 is a diagrammatic flow diagram of a sub-process of control of sub chat rooms in a control, listing and automatic selection of callers according to predetermined criteria in accordance with an interactive broadcast management system in accordance with an embodiment of the present invention.

FIG. 18 is a diagrammatic flow diagram of a sub-process of control of sub chat rooms in a control, listing and automatic selection of callers according to predetermined criteria in accordance with an interactive broadcast management system in accordance with an embodiment of the present invention.

Figure 19:
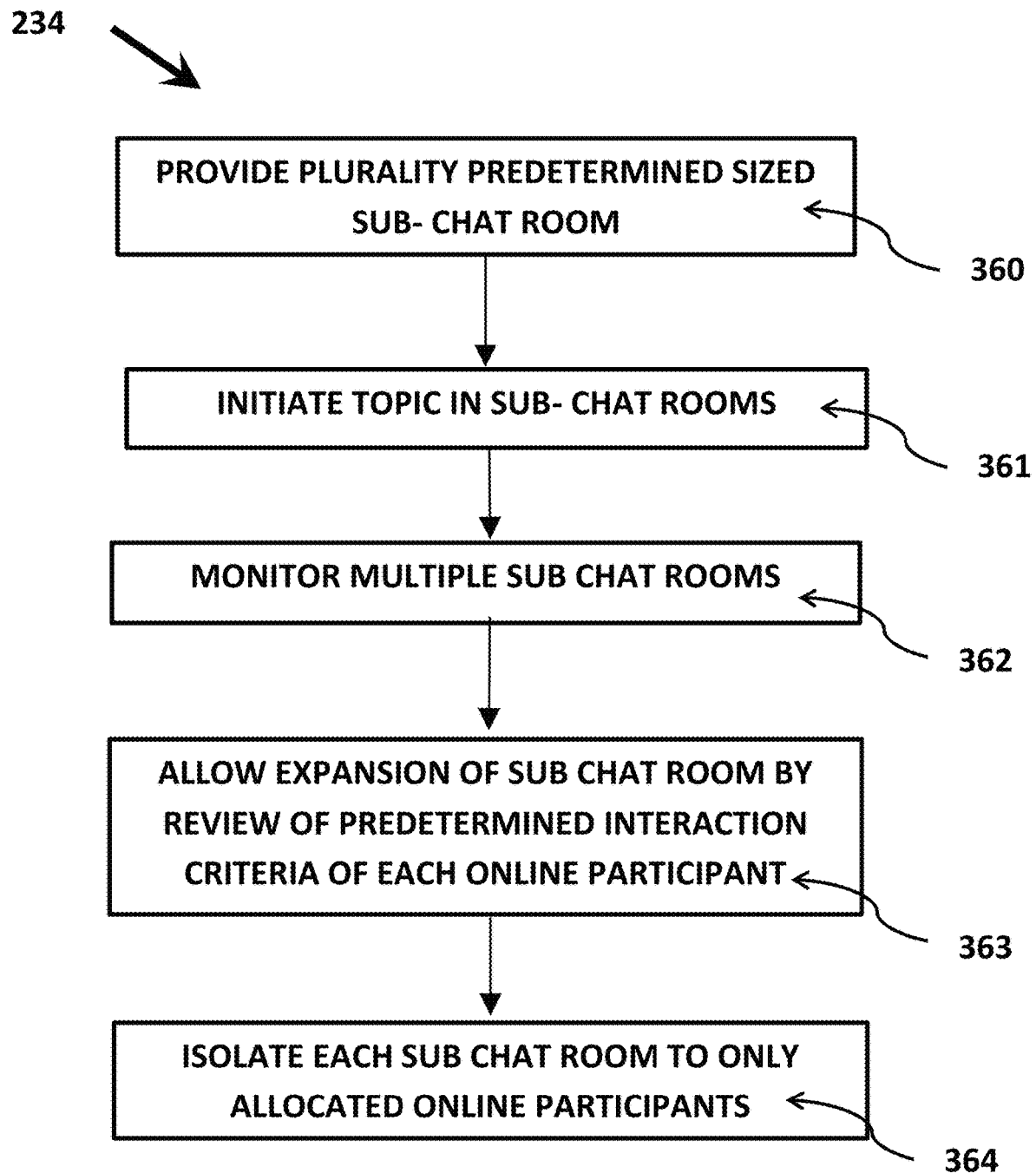
FIGS. 19 and 20 is a diagrammatic flow diagram and diagrammatic view of expandable chat room of a sub-process of control of sub chat rooms in a control, listing and automatic selection of callers and expansion of chat rooms in accordance with an interactive broadcast management system in accordance with an embodiment of the present invention.
Figure 20:
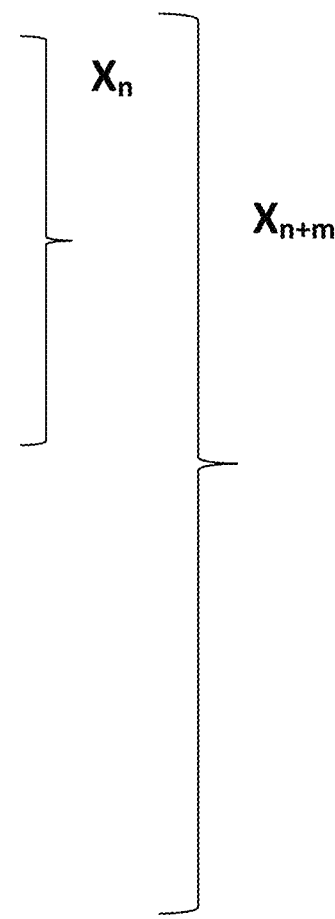

FIGS. 19 and 20 is a diagrammatic flow diagram and diagrammatic view of expandable chat room of a sub-process of control of sub chat rooms in a control, listing and automatic selection of callers and expansion of chat rooms in accordance with an interactive broadcast management system in accordance with an embodiment of the present invention.

It can be seen that the invention provides an interactive broadcast management system for defining chat room with sub chat rooms 521, 522, 523, 524.

means for allowing allocation of online participants 501, 502, 503, 504, 505 and 506 to sub chat rooms 521, 522, 523, 524.

means 530 for monitoring interaction of online participants 501, 502, 503, 504, 505 and 506 in a sub chat room 521, 522, 523, 524.

The computer program product allows interactive broadcast management system to provide an online control panel 530 for managing and automating online participants' interaction/relationships with a broadcaster and/or broadcasting channel.

Technical characteristics of the invention is that there is:
a) Group structured—slows down a scrolling screen of comments
b) Click and drag function for participants to respond to other participant's comments. Refer to FIG. 20 showing responsive exchange mechanism. Time out function after 30 minutes of inactivity creates new space in group and colour changes from red to yellow.
c) Interactive rating by observers of participants comments in the discussion group on a scale of 1-5 on the right side of the screen.
d) When a group is full (red indicator), automatically opens the next group# identified by the green icon.
e) Voice to text on right hand side of screen
f) Time synchronisation line.
g) You are identified by a username or an avatar with an adjacent user name. Ability to insert a photo or video into your discussion line.
h) Tailoring option to control the number of participants in your group example (T4) icon on left side on screen.

It can be seen that embodiments of the invention undertake a number of reviews and then automatically act on those reviews to alter how the system then proceeds. For example, the review can be of the number of people joining a sub chat room due to the amount of interaction of those people and the range of opinions of those people.

In FIG. 20 there are a range of opinions in a predefined sized chat room of $X_n$ and due to the two opinions A B being common and of interest the subtleties or more detailed opinions are required. Therefore, there can be an automatic expansion of the size of the chat room to $X_{n+m}$ if there is the required predefined amount of interaction, predefined amount of variance of opinion, and or amount of predefined interest in this chat group over others. In this way as shown in FIG. 20 the opinions are limited to A and B but the interaction is substantially increased to develop By the automatic monitoring of this chat room the interaction and range of opinions can be determined and therefore selective feedback by selection of one of these interactive participants will give the broadcaster a good feedback and a developed feedback by the interaction.

It can be seen that as a result of one or more of those reviews an automatic change can occur in:
(i) the size of the chat room;
(ii) ranking of people in that chat room
(iii) the number of people to be selected from that chat room rather than other chat rooms.

Referring to FIG. 34, the ranking system can be noteworthy clicks of observers following and supporting a person's opinion and is automatically tracked and indicated. More noteworthy clicks could apply if a response is filed to that opinion.

Within that identification of noteworthy comments the person can rank the comment on a scale of −5 to +5. In this way a ranking of agreeance or dis-agreeance of the noteworthy comments is automatically collated.

For example the ranking within the group could provide displayed ranking avatars of:
Diamond
Square
Circle
Triangle In this example these are individual avatars within a group. The individual's comments are allocated against their avatar or user ID. The associated noteworthy indicator is in this example 1740, while the Yellow #1 associated noteworthy indicator has 190 noteworthy clicks.

There can be a noteworthy enhancement function providing a system enhancement to prevent abuse of the use of the number counter.

Figure 21:
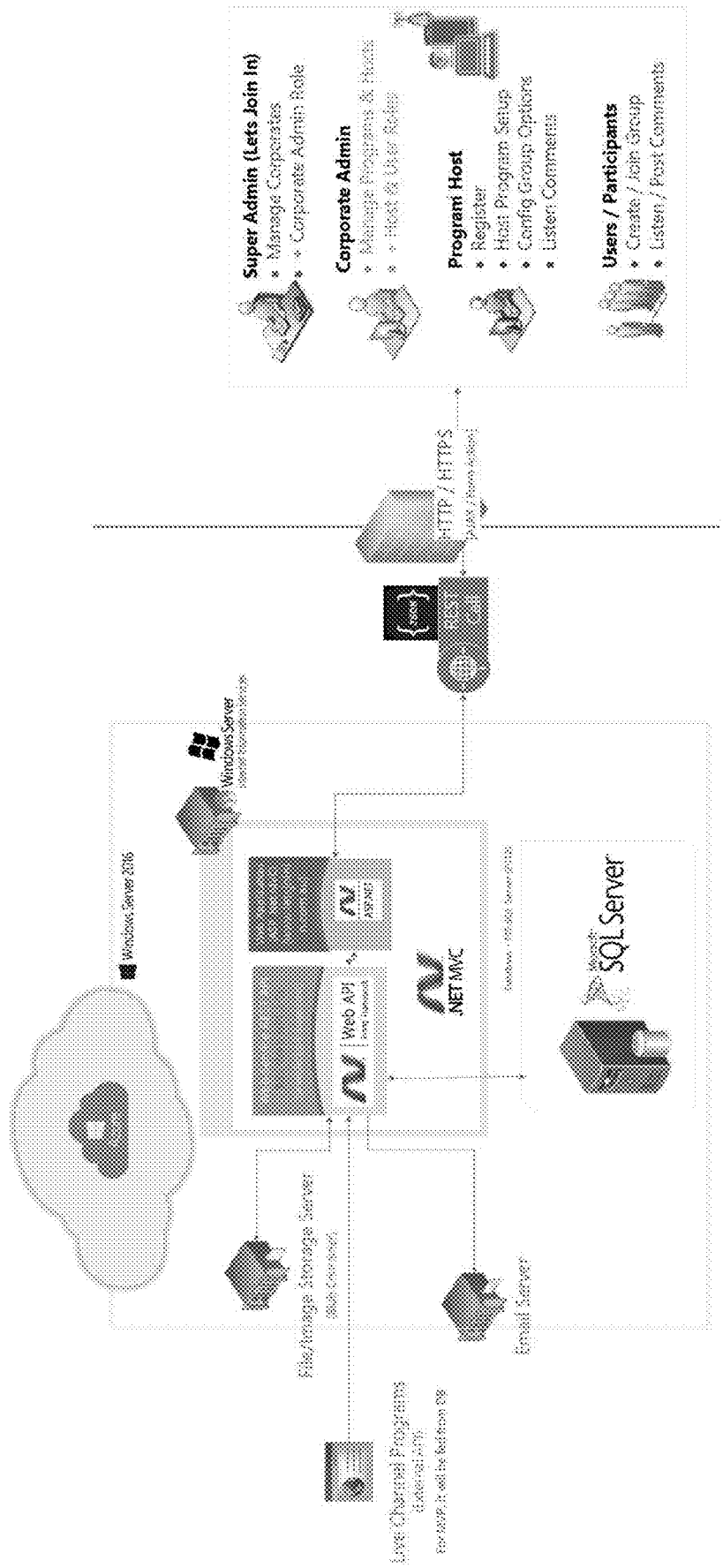
FIGS. 21 to 25 are flow diagrams of the method of processing in the interactive broadcast management system of an embodiment of the invention to provide the feedback and content creation portion for use in a broadcast system.

FIGS. 21 to 25 are flow diagrams of the method of processing in the interactive broadcast management system of an embodiment of the invention to provide the feedback and content creation portion for use in a broadcast system. As shown in FIG. 21 there is a broadcast live channel program with feedback through a web API with controlled admin, program host and user participants.

Figure 22:
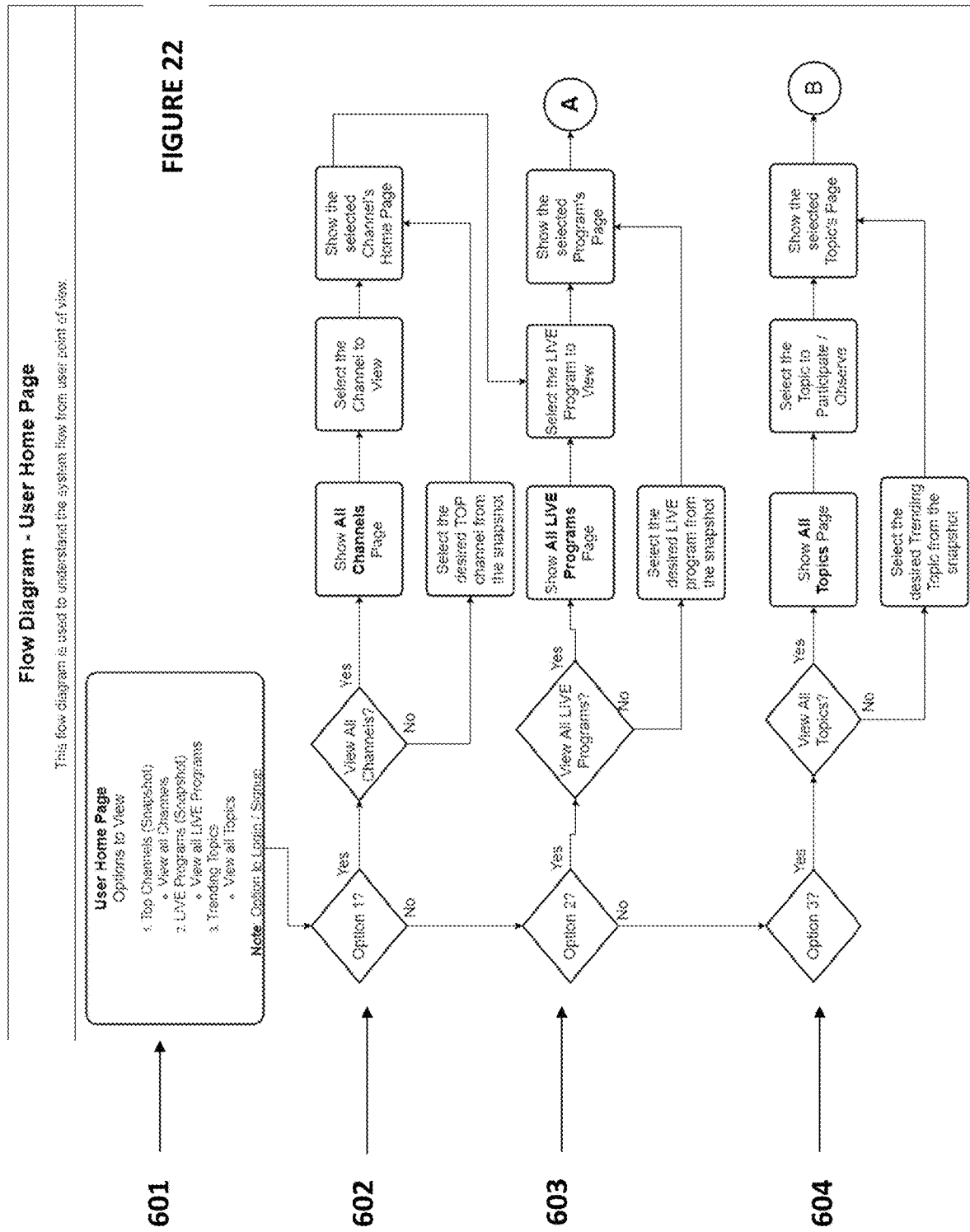

Referring to FIG. 22 there is first step 601 in which the intending contributor/user has access to the user home page and has the view of Top channels snapshot, live programs snapshot and trending topics. The user can then login/signup to options.

If the first option is selected, a subroutine 602 is enacted and the option of viewing all channels is available and if selected, the all channels page is disclosed and allows the user to select the channel from all of the channels which results in showing the selected channels home page. If the view all channels option was not selected, the default is the select the desired top channel from the snapshot and that leads to showing the selected channels home page.

If the second option is selected, a subroutine 603 is enacted and the option of view all live programs is provided and if accepted results in showing all live programs on a live program page. It is then that the user can select the live program to view. This choice also follows from the step 602 after the selected channel home page. In the step 603 if the view all live programs is not selected then the default of the select the desired live program from the snapshot results in proceeding along the pathway. The result of proceeding from these three pathways is to show the selected program page and ready to proceed past station A to the next steps.

If option 3 is the selected option, the subroutine 604 applies in which the user has option to view all topics. If selected it shows the all topics page to allow selection of the topic to participate in or to observe and then to show the selected topic page and ready to proceed past station B to the next steps. If the view all topics was not selected, the default of the selecting the desired trending topic is enacted and then the display of the selected topic page to proceed past station B.

Figure 23:
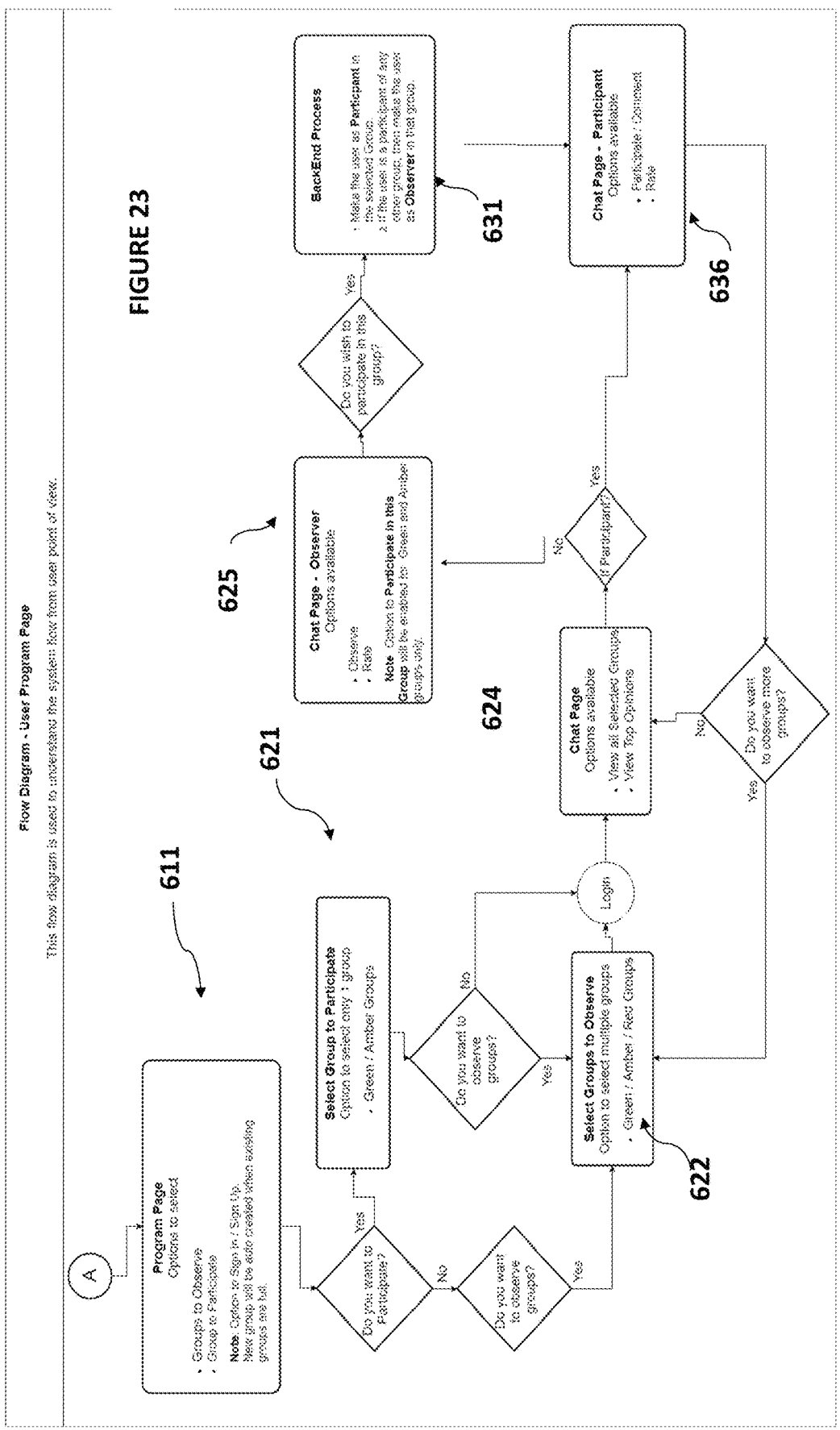

As shown in FIG. 23 passing station A leads to step 611 in which program page gives options to select. If the user chooses to participate then this leads to step 621 of selecting the group in which to participate. The groups available are only the green or amber groups as these are the ones that have space for more participants whereas the red groups are considered full. This leads to selecting the groups to observe. Clearly if the user initially only wished to observe then they would not have a selected group to participate in but only a or more groups to observe.

The user/contributor or the observer can then login to the chat room 624 where there are options to view all selected groups or view only the top options. These top options can be determined by noteworthiness, amount of interaction or trending.

If you are a participant, you will access and participate in the chat room at 636 and thereby develop the interactions. You are also able to rate the comments by the noteworthiness or relevance.

If you are not a participant but an observer then you can proceed to the observer page 625 and be able to observe the comments, the development of the interaction and to understand the comments. The observer can then rate the comments in the chat room based on their noteworthiness or relevance.

As an observer and seeing the discussion it is possible in step 621 to elect to transfer from being an observer to be a participant and taking part in the interactions in the chat room of 636.

Figure 24:
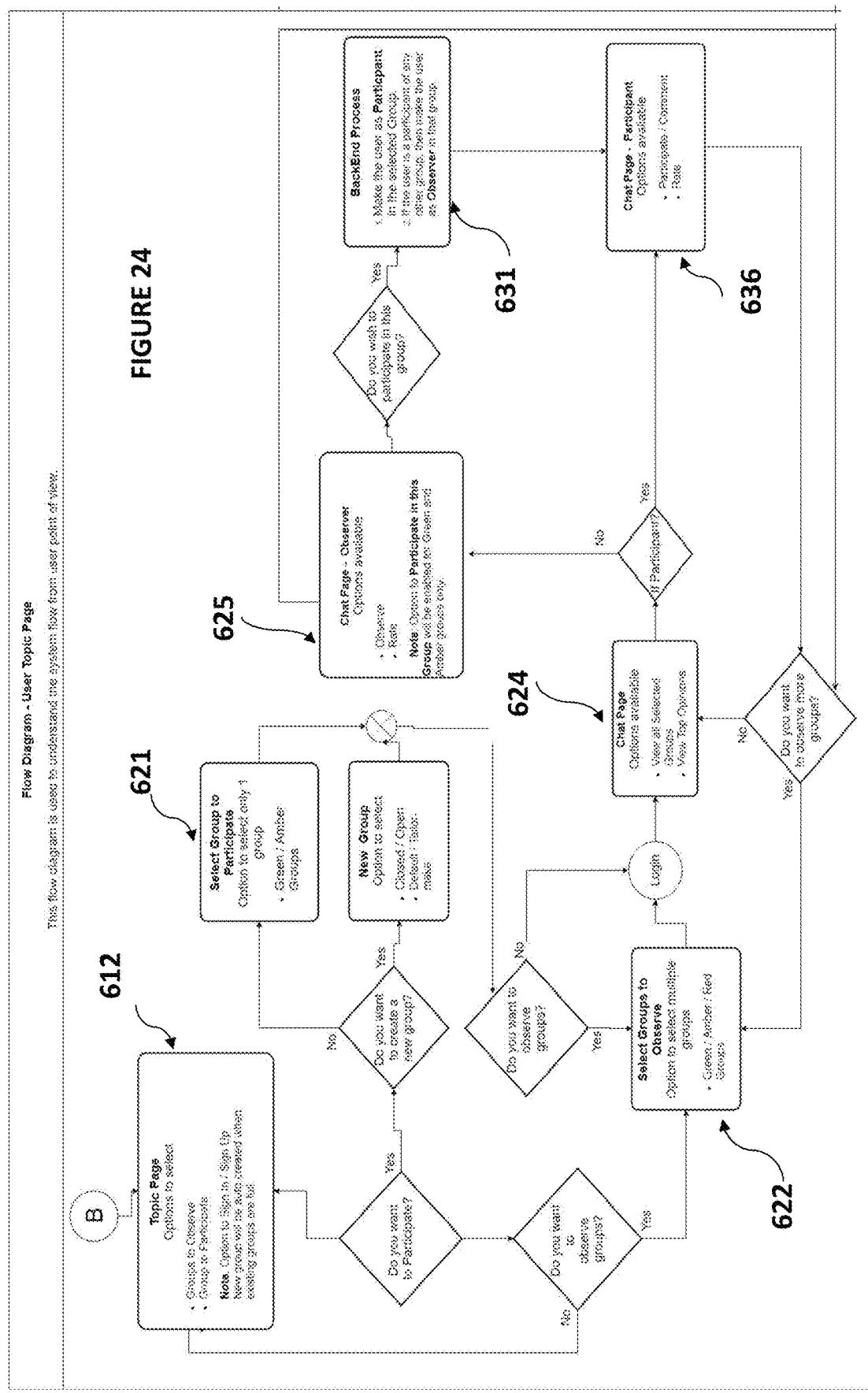

As shown in FIG. 24 passing station B leads to step 612 in which topic page gives options to select. If the user chooses to participate then this leads to step 621 of selecting the group in which to participate based on topic. The groups available are only the green or amber groups as these are the ones that have space for more participants whereas the red groups are considered full. This leads to selecting the groups to observe. Clearly if the user initially only wished to observe then they would not have a selected group to participate in but only a or more groups to observe.

The user/contributor or the observer can then login to the chat room 624 where there are options to view all selected groups or view only the top options. These top options can be determined by noteworthiness, amount of interaction or trending.

If you are a participant, you will access and participate in the chat room at 636 and thereby develop the interactions. You are also able to rate the comments by the noteworthiness or relevance.

If you are not a participant but an observer then you can proceed to the observer page 625 and be able to observe the comments, the development of the interaction and to understand the comments. The observer can then rate the comments in the chat room based on their noteworthiness or relevance.

As an observer and seeing the discussion it is possible in step 631 to elect to transfer from being an observer to be a participant and taking part in the interactions in the chat room of 636.

Figure 25:
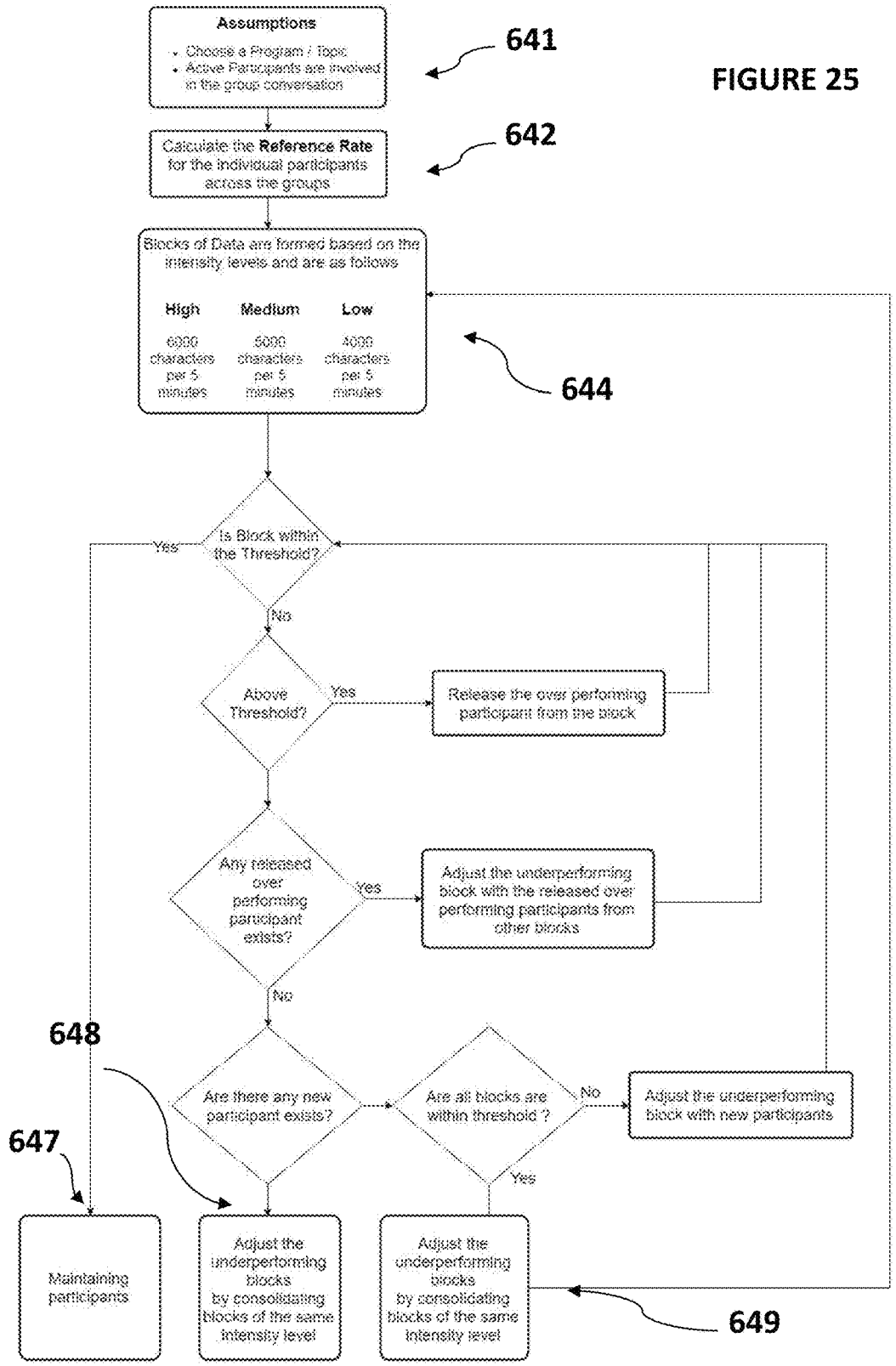
Figure 26:
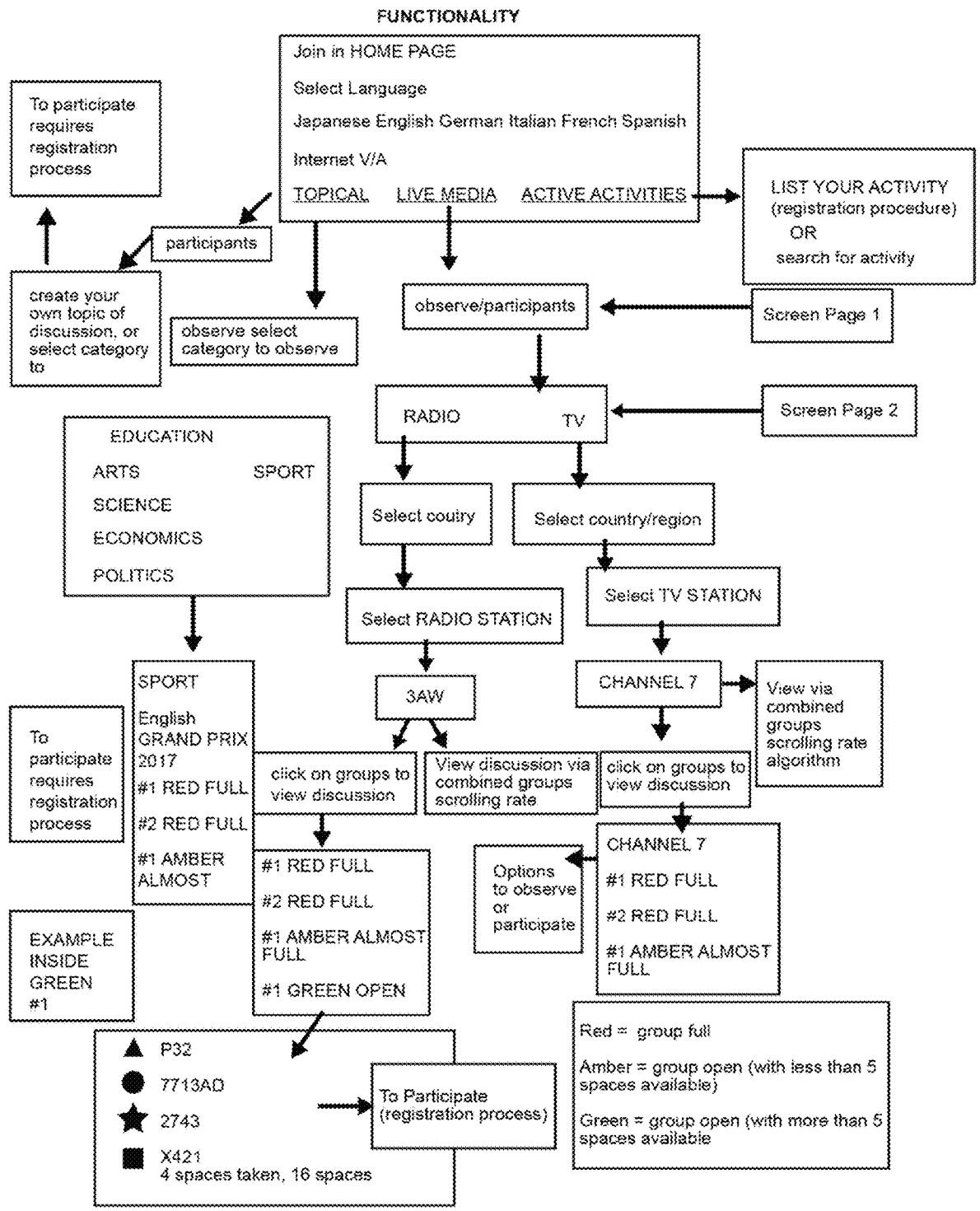

Referring to FIG. 25 there is shown

The conceptual overview of an embodiment of the invention with reference to drawings of FIGS. 26 to 29 includes:

A) Real-Time Media Interface
Information exchange/interaction Group formation
Real time-interaction with media
Potential market 20 million plus
Interact live with audio or visual media
listen to broadcast or watch TV whilst joining in group discussion
Option to join in a group discussion that has not yet been filled to 20 people, create a new group or click on different discussion groups to simply observe.
Key feature—limit of 20 participants per discussion group
Ability to support or contradict an individual's comment in the discussion group by another discussion group member.
Alternate to ringing broadcast station and being a talkback caller or a texter, where the broadcast
announcer reads out the text messages. Icons (avatars) represent individuals B) Not Real time: |Topical Discussion|
Topical discussion in sub categories—hobbies, breaking news, sport, politics, current affairs, business, religion, travel etc.
Ability to join in a discussion group (up to 20 individuals) or create a new discussion group topic.

Join in conversation or just be an observer by clicking between different discussion groups A topical discussion group can have historical content which can be added to.

Key Components

Live interaction with media: Broadcast, TV

Structured into group formation: participants interact with each other within groups Different levels of group interaction Level 1: Click on open groups and simply observe the discussion between the participants (in text form) whilst you and the participants are listening to, for example, talkback broadcast or watching TV.

Level 2: Seek to join a discussion group and participate in discussion whilst all the people in the group are listening to or watching media.

Level 3: When all discussion groups are full, you have the ability to create a new discussion if your intention is to participate, and not just observe again whilst listening or watching live media.

Unique characteristic is that each discussion group has pre-set numbers of participants either 10 or 20. When one discussion group becomes full, another can be opened. A session on talkback broadcast could have hundreds of discussion groups at any one time and TV could have even greater numbers as active groups.

Inactive participants "time out" to create space for a new participant

TOPICAL—media interface

Figure 27:
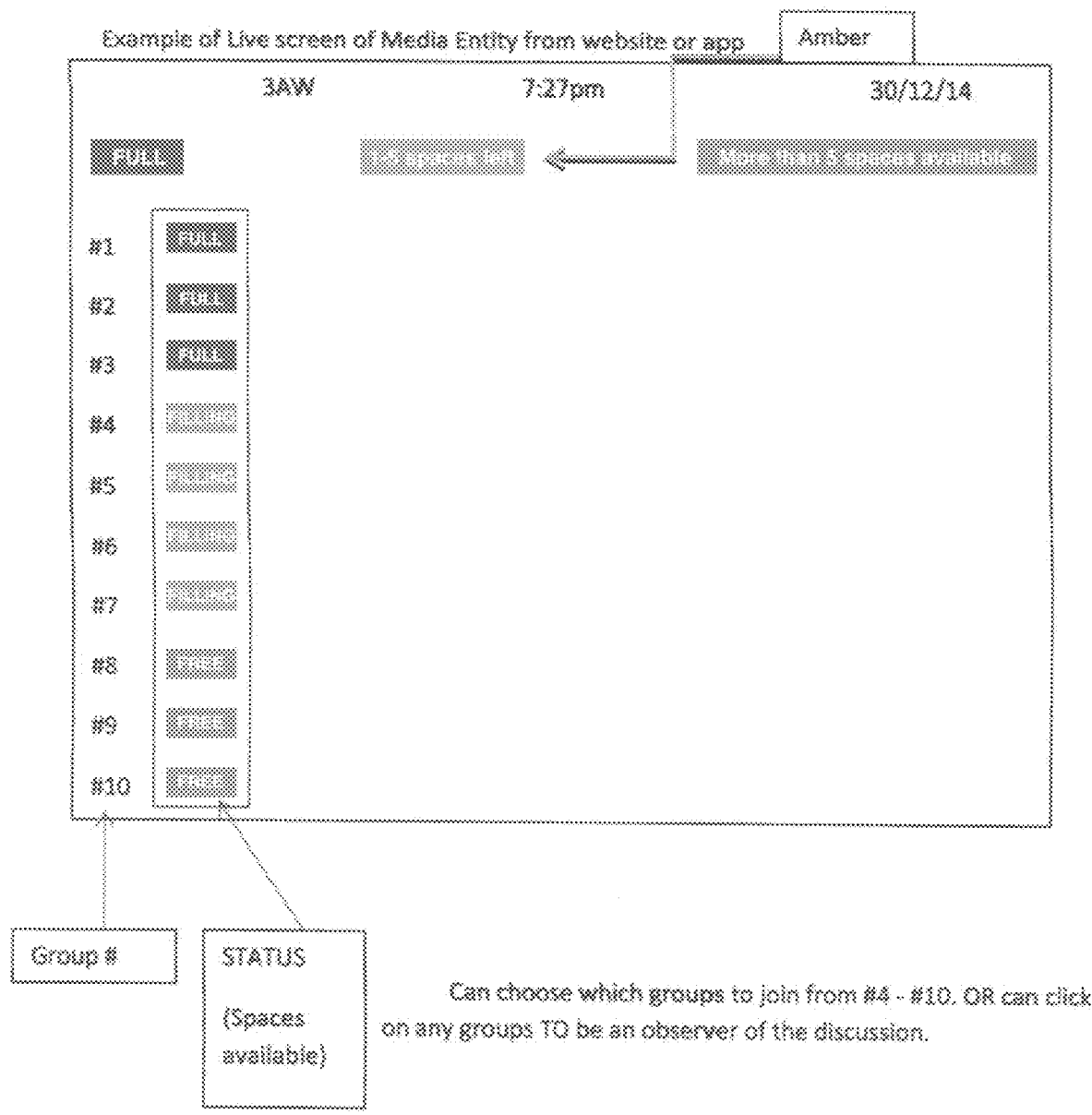

As shown in FIG. 8 or in particular form in FIG. 27 all groups are numbered in numerical order. The full groups highlighted in red. When groups have 5 spaces to fill, the green changes to an amber colour, meaning "Almost Full".

This traffic light system makes it recognisable worldwide and allows people who want more conversation to join the "almost full" discussion groups. People wishing to participate can only enter into discussion with groups in green or amber. Otherwise can observe red and green/amber groups.

There can be traffic light adaptations.

In one form there can be relationship between each group based on time. Therefore Red #1 achieved full anticipation at 6.10 pm. Red #2 achieved full participation at 6.12 pm. In this way the immediacy and timely interest in opinion is determinable. Also a second sub-chat room can be created with this topic as the interest is clearly as shown to be in this part of the discussion due to how quickly the first sub chat room filled.

In another form there can be can be a relationship between each group based on the number of noteworthy clicks. That is those following the conversations or responding to the conversation generates noteworthy clicks of that person's opinion and is automatically tracked and indicated. For example, the Red #1 associated noteworthy indicator could be 1240 while the Red #2 associated noteworthy indicator has 1135 noteworthy clicks.

Other features and benefits include:

Registration process required to enter a group stating email address and username/password.

Ability to have group discussion other than live media on topical issues i.e.: social, breaking news, politics, etc. using same format i.e.: groups of 10 or 20, groups coloured in red, amber or green and numbered.

Ability to support or contradict another participant's comment within a group. Icons or names or avatars represent each individual in the group Option to have a closed group where the other participants in the group are known to you. Active timeline indicator with group discussion—can be used for podcasts Create code of conduct for guidelines for conversation between individuals: To control inappropriate language between individuals when the conversations become argumentative participants acknowledge the code in the sign-up process.

Historical conversations kept for synchronising with podcasts

Disclaimer-comments made are not subject to court orders.

Grab and drag avatar of other participant in your group onto your line to specifically respond to their comments.

Ability to insert image or video

Group structured format makes it suitable for app development

Options for creating a new discussion group

Default option

When a discussion group is filled, highlighted by the red indicator, this automatically creates the next group number highlighted by the green indicator Tailoring option The ability for the individual user to create a discussion group by choosing the number of participants they wish to have a discussion with. Set in range of 4-20.

Discussion group screen

To identify the type of discussion group, observers whilst listening to or watching live media, can scroll down the screen to see which discussion groups interests them. The "D" symbol identifies default group of 10 or 20 participants.

The "T" symbol identifies a tailored group with four individuals

Screen.example:

D #1 Red T4 #2 Red D #3 Red T7 #4 Red

Observers rating system has the ability of observers to rate the comments of participants on a scale of 1-5 agree or disagree. Rating appears on right hand side of participants comments. Click on the rating number box and rate the comment.

Reading System

We all have different reading abilities. Some of us are fast readers whilst others are slower. Our speed readability will determine which type of block intensity we click on. The fundamental purpose of this part of the concept is to present a feature of a website/app that will be dynamic and engaging. Periods of inactivity in the comments of participants are overcome by auto re-organising the participants to keep the conversation flowing at the predetermined reading speeds of high, medium and low.

Referring to FIG. 15, FIG. 25, FIG. 28 and FIGS. 37 to 42 there is shown a mathematical method based 'Reading Rate Automation'. In particular there is in FIG. 38 a reading rate algorithm engine for converting and maintaining groups based on their activity. It comprises three elements of calculating individual participant's input typing character reference rate, categorising that reference rate and then as per FIG. 15 translating observed groups 161 to blocks of data 171 that are formed based on intensity level.

Figure 28:
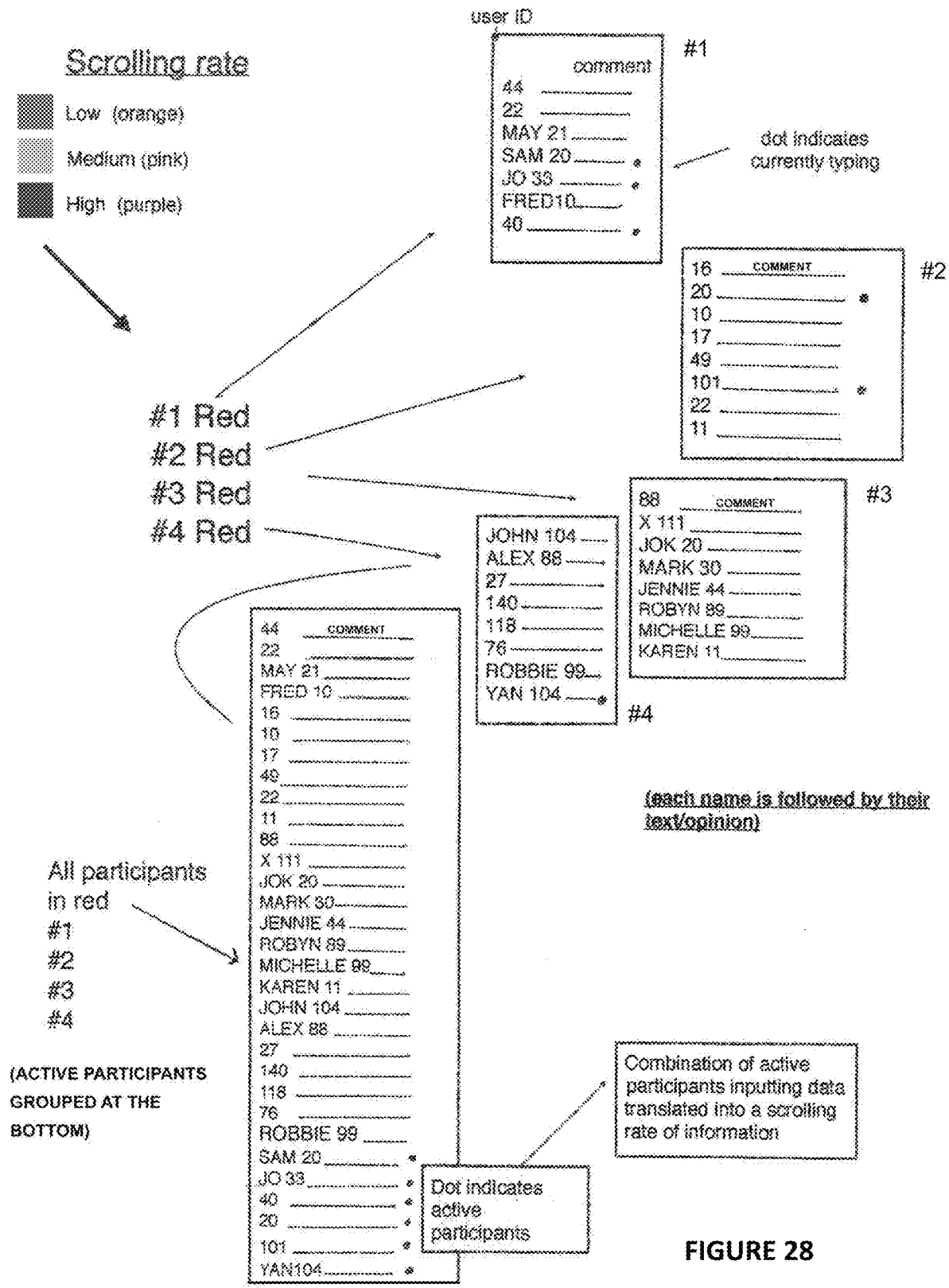

As shown in FIG. 28 there are four groups comprising #1 Red having 7 participants but only three indicated by dots as being active. In group #2 Red there are 8 participants with two active. Group #3 Red has 8 participants and none active. Group #4 Red has 8 participants with one active. The groups van be formed into the block of all participants but showing that only 6 are active. This can now form a combination of active participants inputting data and translated into a scrolling rate of information. In effect it becomes the participant pool of FIG. 39.

The mechanism therefore provides a group consolidation with group close function. If activity drops to 500 letter characters or less per 5-minute period within a group, all members of the group (as distinct from an individual) are prompted with the question: "Do you want to remain active?" as per FIG. 40. The algorithm also sets a limit on the maximum number of letter characters typed under an individual user ID. That limit as per FIG. 41 is 400 letter characters per minute. The system recognises that to be the maximum achievable within human ability. Copy and paste procedure will not qualify to enable the user to be active.

Therefore, the functions of the algorithm cover:
a) scrolling of text information;
b) tailored to different reading rates
c) group closure function; and
d) individual ID activity tracing.

The aims include to:
a) avoid automatic inputs by bots and ensure real person input;
b) keep the conversations flowing;
c) match input rates with reading rates;
d) allow reorganisation of comments so that active conversations are provided for review and usable reading rates for broadcast;
e) the auto-create (expand) or auto reduce (contract) keeps the text comments of participants in time sync (relevant) with the comments or vision on live broadcast media with no time lag.

The "character response rate concept" uses reference rate per minute and determines the group Color coded system. For the mathematical formula to work, all group sizes need to be the same, creating a flowing rate of conversation with the reference rate per minute is defined as
1200 or greater characters per minute is purple,
1000 or more per minute is pink,
800 characters per minute is orange.
The benefit for the observer is a rich interactive experience, high performance standard and speed of conversation.

The INTENSITY definition is "the flow rate of letter characters over a set period of time". The flow rate of letter characters is blocked into time periods. Flow rates are grouped into low, medium and high. The low medium and high flow rates are correlated to a person's reading rate. They are "BLOCKS OF INTENSITY" not "GROUPS". High blocks of intensity have a faster reading rate for the observer who is overlooking the discussion taking place on live media or by topical discussions. This means there is a faster scrolling rate on the page being viewed.

A "Flowing conversation" occurs if the numbered data blocks guarantees to the observer visiting the site a flowing conversation over a period of time without a period of inactivity. A participant who becomes inactive, subject to set parameters within a block of intensity, will activate another participant to take their place and become a part of that block to keep the reading rate at the present level.

Peak times of activity by participants result in many blocks being active with different intensity levels. In off-peak times such as late at night into the early morning, there will be fewer blocks of intensity active. Peak periods could have 50+ each of high, medium and low blocks of intensity with participants active in them, whilst listening/watching a particular live media. Whereas, off-peak periods could have less than 10 each of high, medium and low blocks of intensity running.

Figure 38:
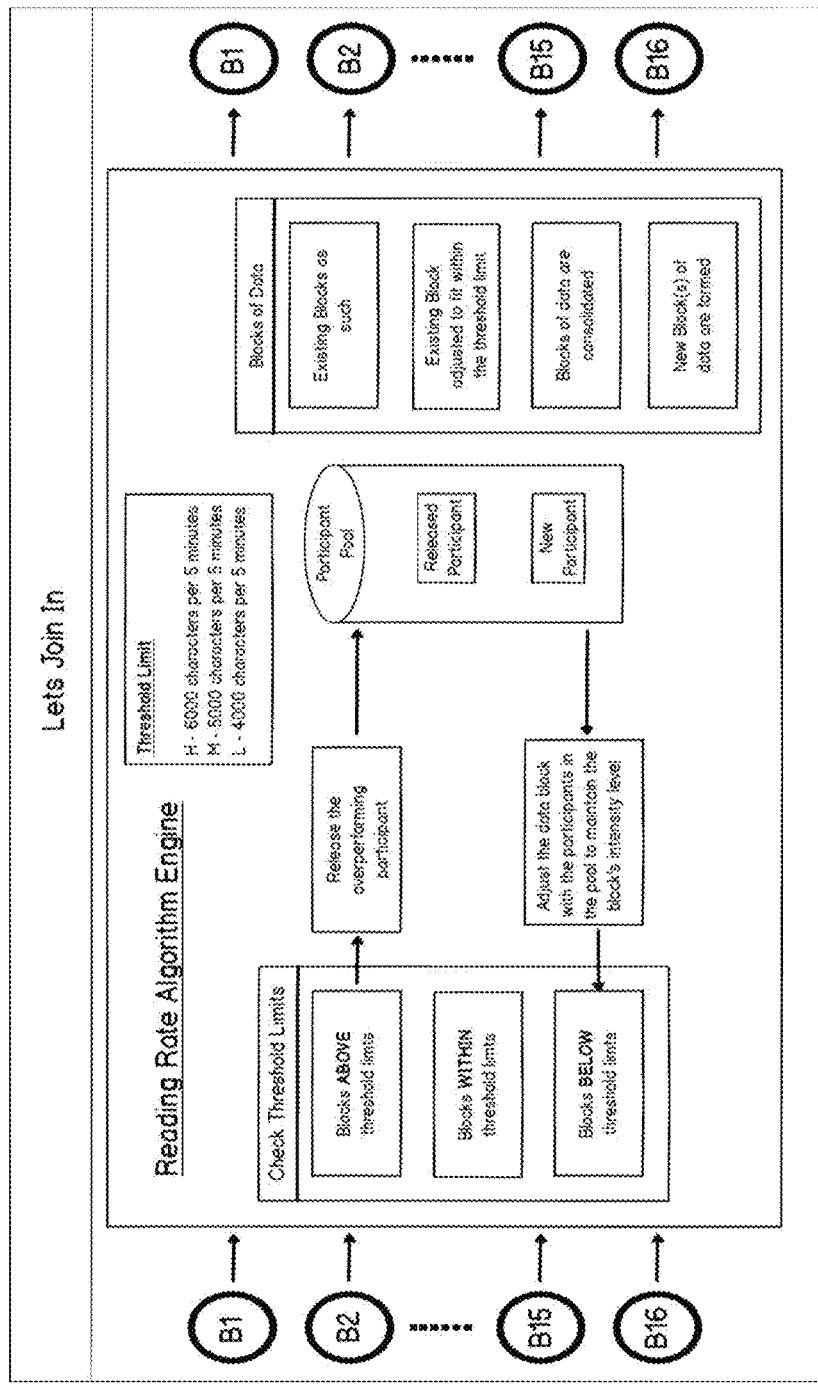
Figure 39:
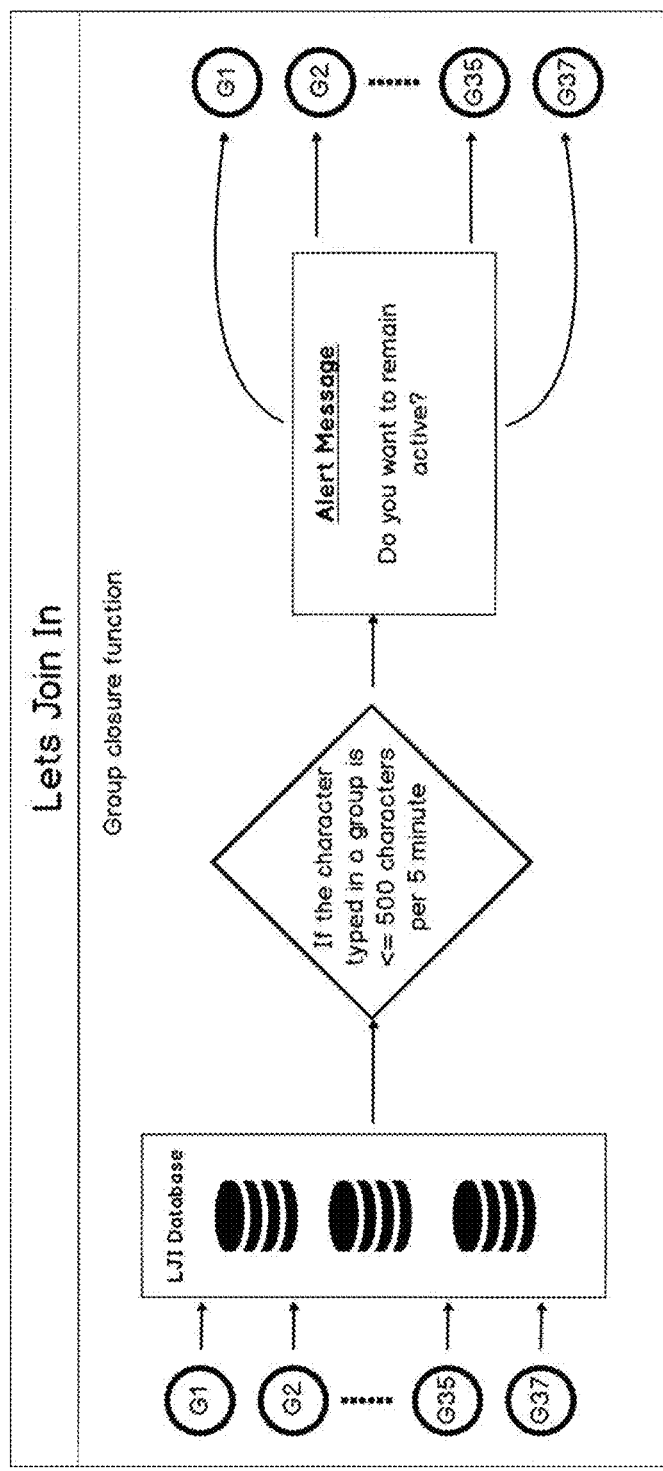
Figure 40:
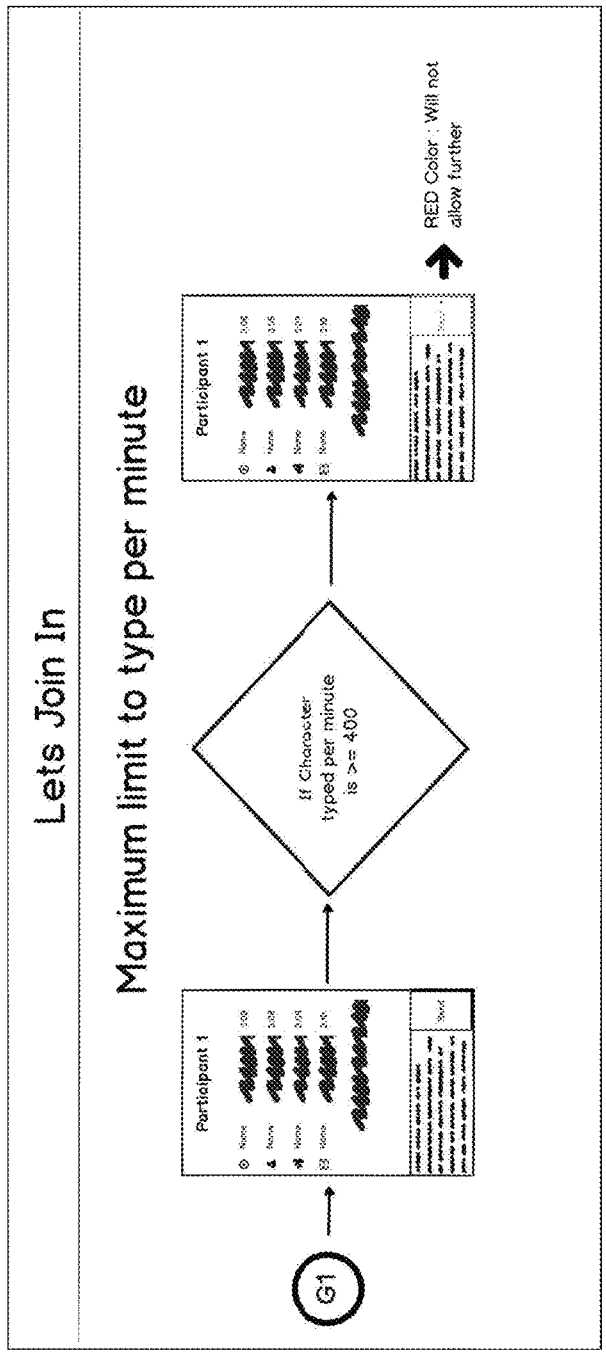

Referring to FIG. 38, Blocks below the threshold of data will be consolidated into other blocks so the number of blocks declines in off-peak periods to keep the conversation flowing. The observers to the site will still see activity but from fewer blocks of intensity to click on and observe the discussion taking place. Moving between peak periods to off-peak periods. Blocks of intensity are consolidated. High blocks of intensity are consolidated to keep the reading rates up to the present level. As the consolidation occurs, blocks are cancelled one at a time automatically. The opposite occurs for moving off-peak to peak periods. Blocks high, medium and low are automatically created by the system.

"Keeping the conversation flowing" is achieved with for example over 5% above the 6000 characters per 5-minute period results in a participant automatically being relocated into an underperforming block of intensity that is averaging below 6000 characters per 5-minute period but rated as a high block of intensity. This prevents the scrolling rate form increasing to a rate faster that no one can read. As per FIG. 40 if character rate being typed is less than or equal to 500 characters per minute an alert message will ask "Do you want to remain active?". Only if you agree will you remain in the group.

Blocks of intensity are Colour "CATEGORISED" not grouped and blocked to high medium low rates of conversation. "Blocks" of intensity are averaged over a 5-minute period. There are BLOCKS of intensity different levels with Variation +_5%. A block of intensity holds a preset number of characters over a period of time and the intensity or that block will determine the speed of conversation.

The benefit of blocks of intensity of entry and managing reading rate is to guarantee the observers FLOWING conversation. Number of characters per 5-minute period does not automatically imply group conversation but could be only 1 or 2 participants.

Information exchange facilitator is by translation into scrolling rates. This is different due to different input digital communications means.

For mobile phones medium rate of intensity equals 5000 characters per 5-minute period=(90 characters per cm of scrolling on average) per 5 seconds. This equals scrolling at 4 cm over a 20 second period or 12 cm of scrolling per minute. Each line of text on a mobile phone is approximately 28 characters.

For a desk top computer rate of intensity equals 80 characters per line=1.5 cm scrolling rate per 20 second period, or 4.5 cm of scrolling per minute A medium reading rate is 12 lines of a newspaper such as "The Age™" text=336 characters at 28 characters per line, read over 18 seconds, equals 18 characters per second or 5000 characters over a 5-minute period.

Web page—Trial 1—by web page at 80 characters per line, at medium rate of reading=100 characters per 6 seconds or 1000 characters per minute. This is the same as 5000 characters per 5-minute period. This Translates into scrolling rates=2 cm per 24 seconds which is the same as 5 cm per minute—by medium rate on a web page, not mobile The advantage of this system is that the auto-create (expand) or auto reduce (contract) feature keeps the text comments of participants in time sync (relevant) with the comments or vision on live media-no time lag.

The aim is for matching of participants typing rate to your reading rate using the letter character typing rate algorithm and designed for observers overseeing the conversation background.

The average person types 200 letter characters per minute or 40 words per minute. The average person reads 1000 letter characters per minute or 200 words per minute. Therefore, the average reading rate (200 words per minute) is five times faster than the average typing rate (40 words per minute). It can therefore be concluded that the average reading rate per minute equals the activity of 5 people constantly typing per minute. This system translates the letter character typing rate to the management system.

If participants are intermittently typing, to achieve the average typing rate of 1000 letter characters per minute, this will involve grouping more participants together.

Example

| | | |
|---|---|---|
| #1 Red | 8 participants | 1000 letter characters per minute |
| #2 Red | 8 participants | |
| #3 Red | 8 participants | |

Therefore Red #1, #2 and #3 into 1 group to match your reading rate

If you as an observer have a slower reading rate, you can reset the parameters, to for example, 700 letter characters per minute (+ or − 20%) The grouping would look like this.

| | | |
|---|---|---|
| #1 Red | 8 participants | 800 letter characters per minute + or − 20% |
| #2 Red | 8 participants | |

Therefore Red #1 and #2 into 1 group. To 20% match your reading rate.

If you have a much faster reading rate, at over 1000 letter characters per minute, the grouping you would be following would involve many more participants. It would involve;

| | | |
|---|---|---|
| #1 | 8 participants | 1200 letter characters per minute + or − 20% |
| #2 | 8 participants | |
| #3 | 8 participants | |
| #4 | 8 participants | |
| #5 | 8 participants | |

Therefore Red #1, #2, #3, #4 and #5 into 1 group to match your reading rate

Figure 42:
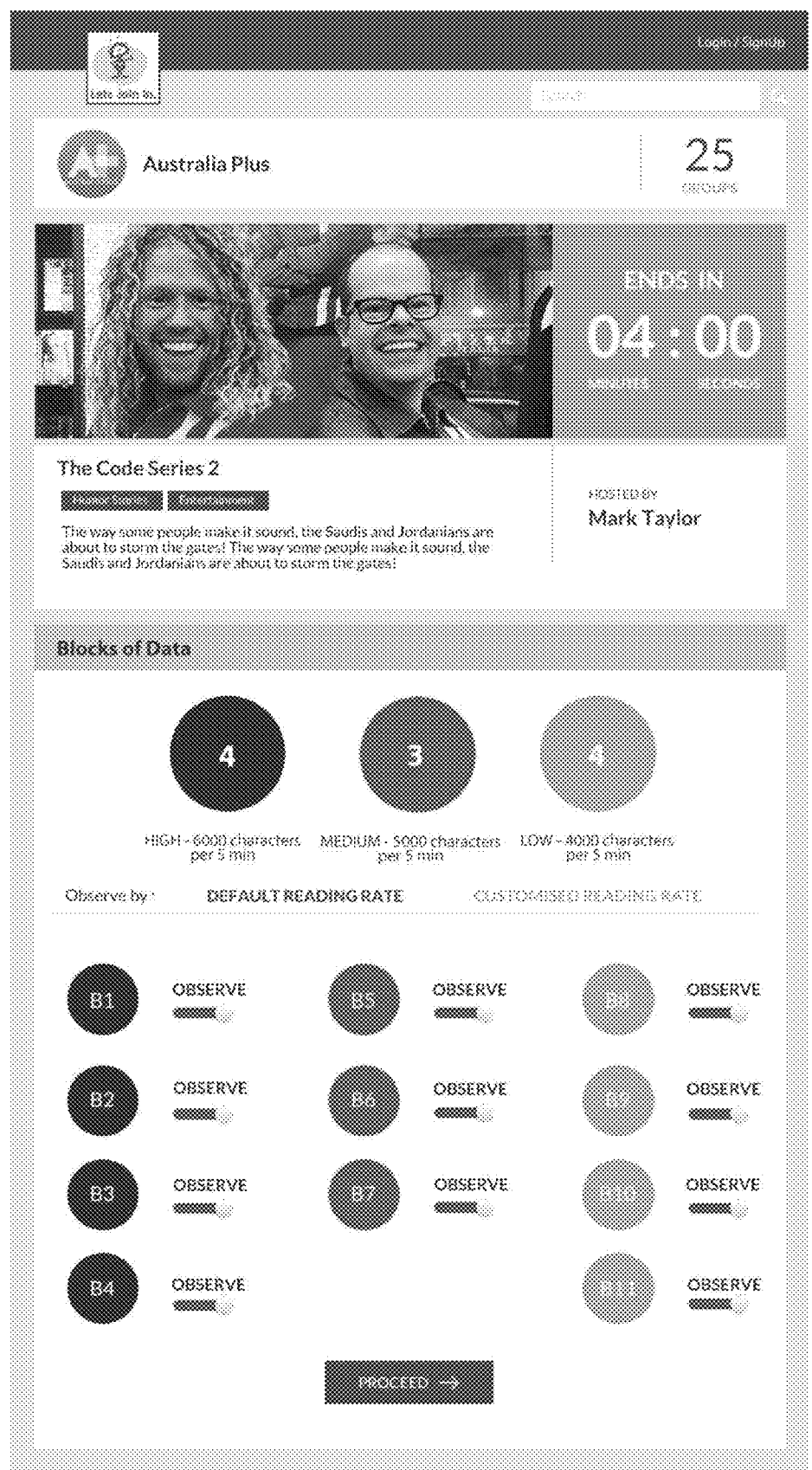

As shown in FIG. 42 observers to the site have a choice to either simply, 1, click on the different coloured blocks to look at the comments of participants, or 2, using the typing algorithm, observe the discussion at their preferred reading rate.

| Terminology | Description |
|---|---|
| Character Response Rate (CRR) | The number of letter characters typed per 5-minute period |
| Reference Rate (RR) per minute | The letter characters typed per minute. |
| Intensity | The flow rate of letter characters over a set period of time. |
| Block of Data | The number of letter characters typed over a 5-minute period of time bundled into a block. |
| Blocks of intensity | The blocks are categorized into different levels of intensity:<br>High<br>Typing rate of 6000 characters per 5-minute<br>Medium<br>Typing rate of 5000 characters per 5-minute<br>Low<br>Typing rate of 4000 characters per 5-minute<br>Note: Random comments make up the block of intensity either in LIVE media or topical discussion |
| Flow Rate (scrolling Rate) | The rate at which the flow of conversation happens:<br>This rate is automatically set by the application<br>(or)<br>Set by the observer that suits their reading rate. |
| Speed of Conversation | High blocks of intensity would have a faster reading rate for the observer. This means there is a faster scrolling rate on the page being viewed.<br>Low blocks of intensity would have a slower reading rate for the observer. This means there is a slower scrolling rate on the page being viewed.<br>Note: The benefit for the observer is a rich interactive experience and high-performance standard. |
| Colour Coded | The different blocks of intensity are colour coded as follows:<br>Purple (fastest reading rote)<br>Pink (average reading rate)<br>Orange (slowest reading rate) |
| Flow of Conversation | The data blocks guarantee to the Lll observer a flowing conversation over a period of time without a period of inactivity |
| Peak and Off-peak Times | Peak time: The time at which there are more number of active participants.<br>This results in many blocks being active with different intensity levels.<br>Off-peak time: The time at which there are less number of active participants.<br>This results in fewer blocks being active with different intensity levels. |

| Terminology | Description |
| --- | --- |
| | Blocks below the threshold data will be consolidated into other blocks. Hence the number of blocks declines in off-peak periods to keep the conversation flowing, The observers would still see the activity; but from fewer blocks of intensity to click on. |
| Click On | The observers click on the different blocks of intensity and observe the discussion taking place |
| Historical Conversation | For observers (that are part of the general public) to see what has been said over a set period of time. |
| Locking a Time Period | Choose (double click on) a block and select the following parameters: Start Time Finish Time This would help the observer to read the conversations or comments that has been said in the set period of time They can also pause and analyse what has been said. |

Print Media

Figure 31:
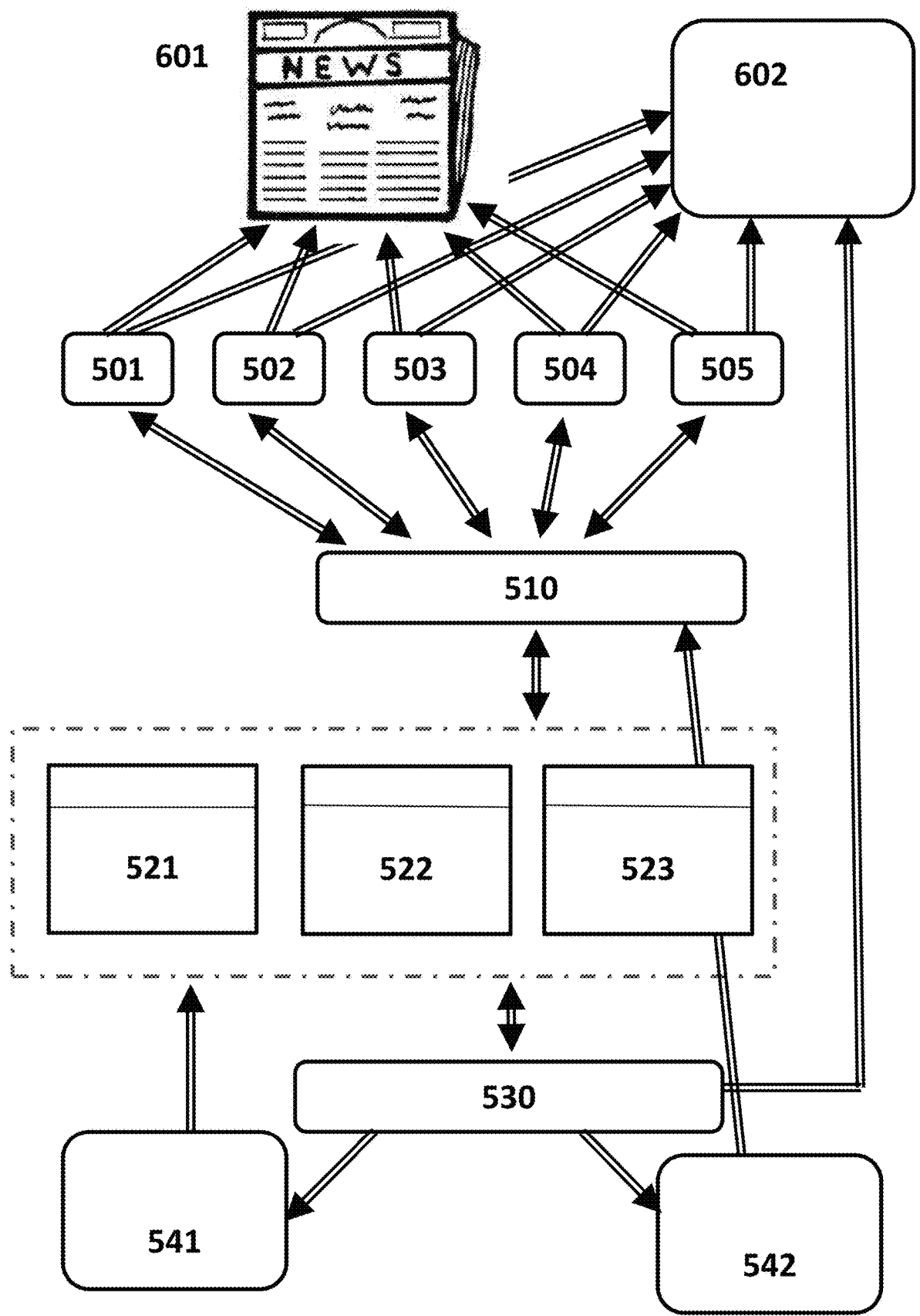
Figure 33:
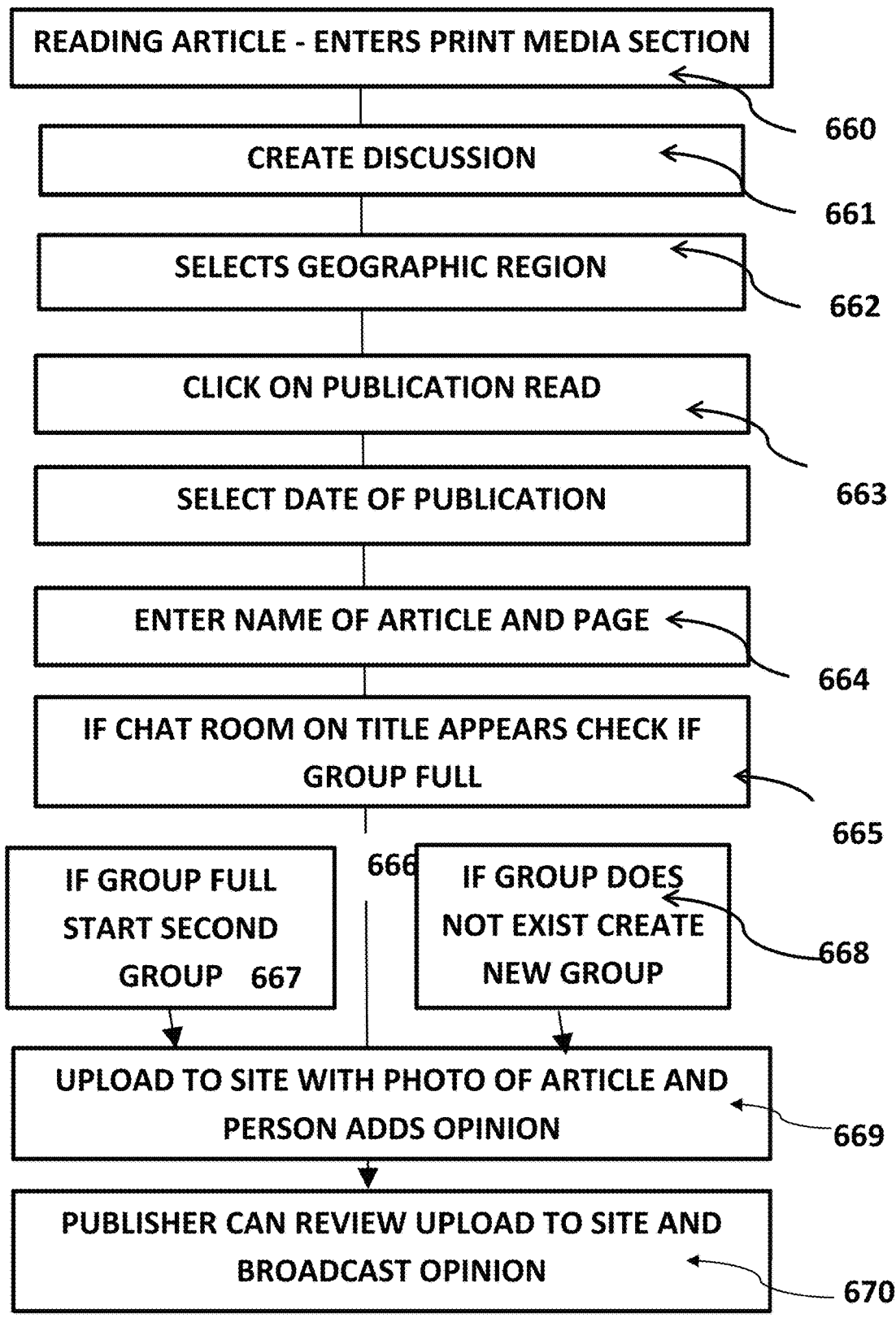
Figure 35:
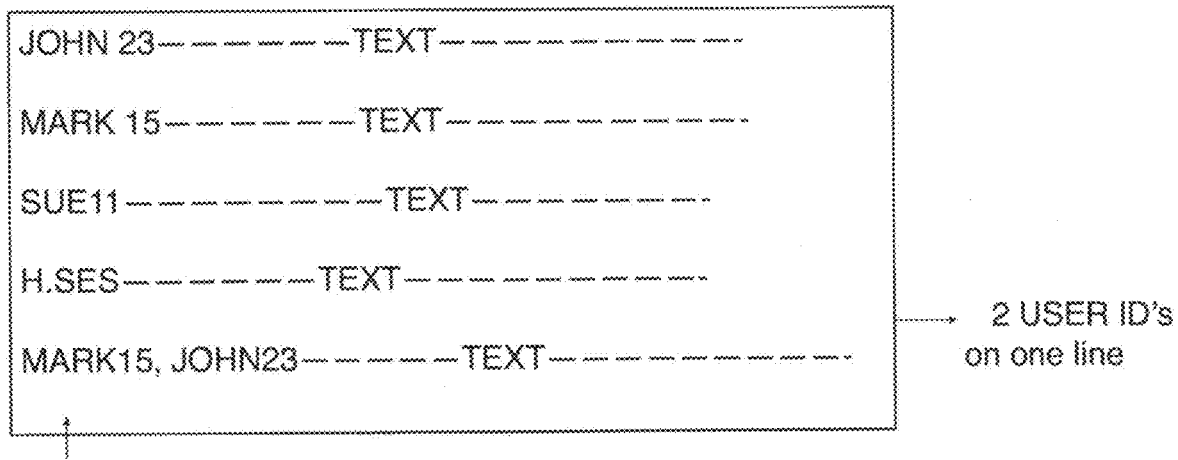
Figure 36:
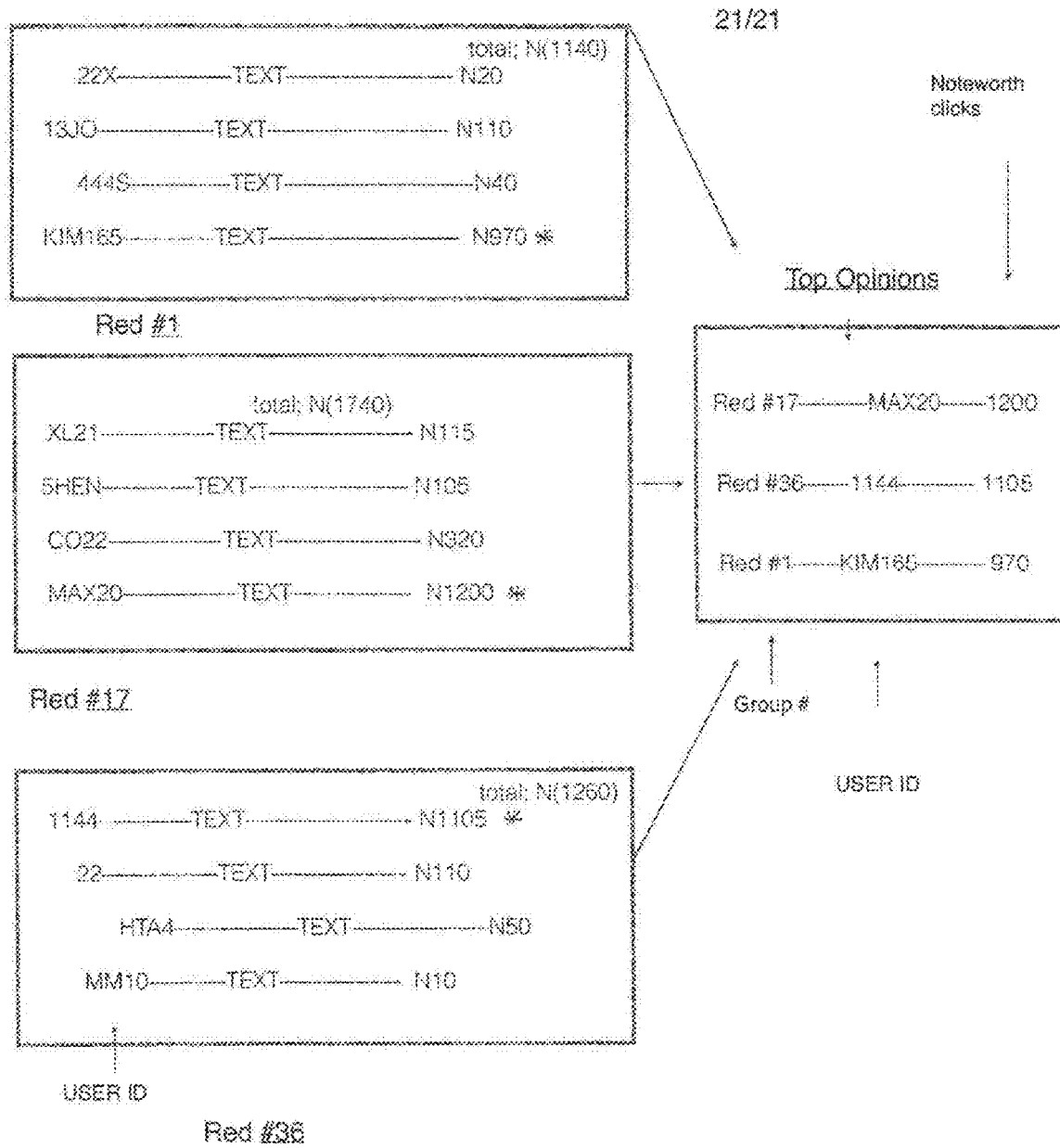
Figure 37:
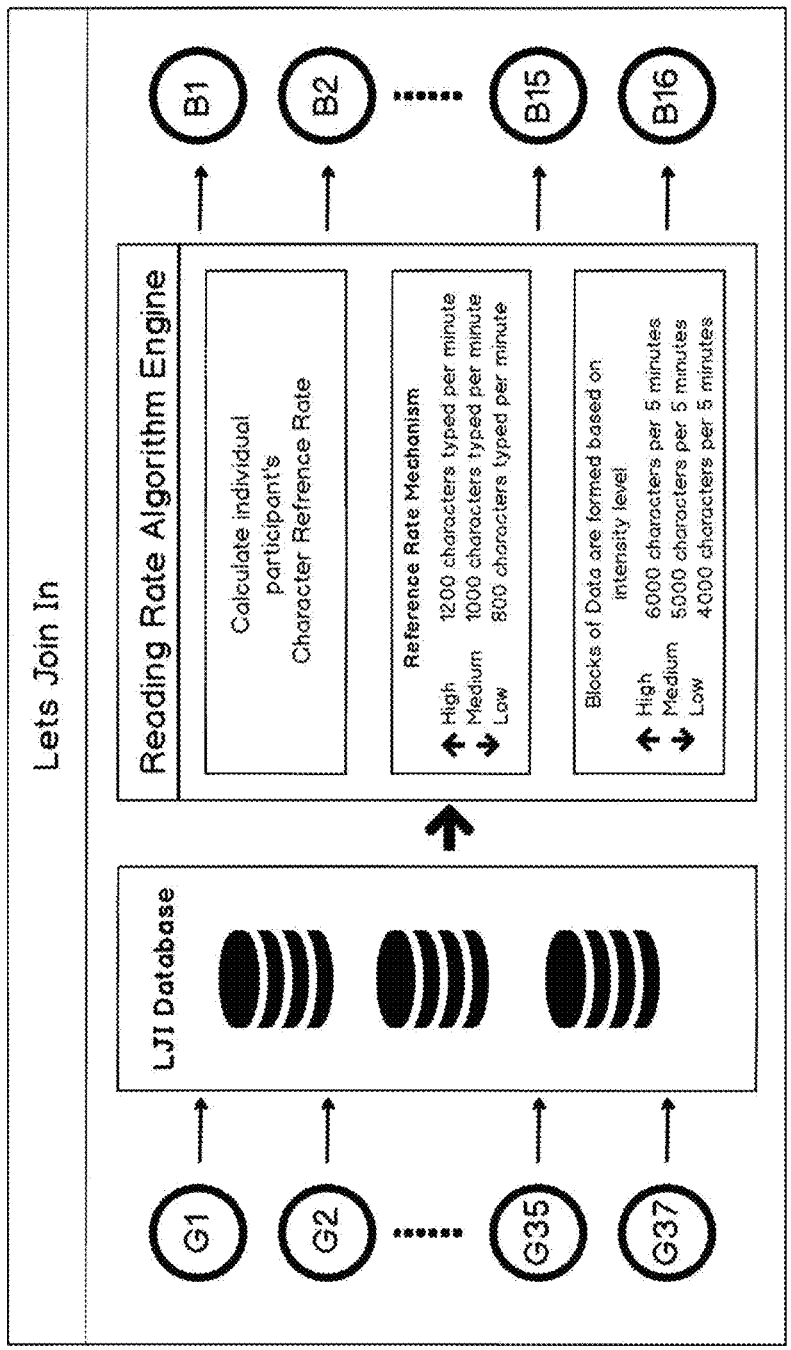

Referring to FIGS. 31, 32 and 33 there is shown a Print Media Adaptation in which there is the review of the written newspaper 601 instead of the broadcasting of television or radio. However, the feedback 602 can also be substantially in time. For example, a newspaper 601 can be advertised as published on the day and the comment in through a feedback broadcast online system 602.

The system of the invention in this embodiment has an online interactive interface 510 accessible by at least one user and a plurality of online participants 501, 502, 503, 504, 505 and 506. The interface interacts with a server having the necessary applications and databases for operating the system.

The interface 510 allows selective connection by the at least one communication means to chat rooms 521, 522, 523, 524. There is selective connection between said user(s) 501, 502, 503, 504, 505 and 506 and a selected one of said chat rooms 521, 522, 523, 524 based on seeing how each chat room is proceeding. The chat rooms can expand such as shown in FIG. 11.

With the at least one interactive tool 530 for assessing the online participant to be selected for engaging by said user(s). This assessment is listing and coding of the opinions, the feedback, and the amount of interaction between participants, the development of the opinions. These can be automatically tracked or tagged in real time to allow automatic monitoring so as to provide a display 550 which involves a plurality of opinions and feedback of the participants and the amalgamation or interaction of the opinions or feedback of the entire sub chat rooms so that not just selective feedback occurs of a small percentage but feedback of a large percentage.

There is at least one feedback tool 541, 542 interacting with the interactive tool 530. One feedback tool can by assessment provide feedback updates and information and displays to the chat rooms 521, 522, 523, 524 so that further interaction and development of opinions occurs, The second feedback tool 542 can be a feedback directly back to the interface accessible by the at least one user 501, 502, 503, 504, 505 and 506 for monitoring and providing feedback to the online participants interest of the plurality of online participants so that the selection of the at least one user 501, 502, 503, 504, 505 and 506 to the chat rooms 521, 522, 523, 524 of interest can be selected or allocated.

Through this at least one interactive tool 530 for assessing the online participant to be selected for engaging by said user(s) and providing an output to the at least one feedback tool 602 whereby the reader of the newspaper 601 can also be seeing and be a participant in the interactive broadcast management system which provides an online control panel for managing and automating online participants interaction/relationships with the broadcasted feedback output.

The process of creating content as per FIGS. 32 and 33 is to have initial step 660 of reading an article and in step 661 creating a discussion. This is achieved by logging in to the app so that there is feedback to the broadcaster by the print media. The entry steps 662, 663, 664 includes identifying the geographical region, the publication read, the date of publication and name of article and page. This identifies the matter and in step 665 determines if there is a chat room and through options of steps 666, 667 and 668 determine if the chat room is full and if not allow entry, if it is create second chat room, if it does not exist start a chat room. The user is then able to proceed to step 669 to upload comment and opinion and processes of the invention similar to review of other broadcast media can allow the review and feedback and the publisher to have usable review that in step 670 allows them to have reviewed conversations of dynamically altering and developing and expanding and contracting chat rooms to provide some complex conversations for use and not random letters to the editor approaches of the prior art.

Definitions

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

The term, "real-time", for example "displaying real-time data," refers to the display of the data without intentional delay, given the processing limitations of the system and the time required to accurately measure the data.

The term. "near-real-time", for example "obtaining real-time or near-real-time data" refers to the obtaining of data either without intentional delay ("real-time") or as close to real-time as practically possible (i.e. with a small, but minimal, amount of delay whether intentional or not within the constraints and processing limitations of the of the system for obtaining and recording or transmitting the data.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The various methods or processes outlined herein may be coded as that is executable on one or more processors that employ any one of a variety of operating systems or platforms. Additionally, such may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or " " are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

For the purpose of this specification, where method steps are described in sequence, the sequence does not necessarily mean that the steps are to be carried out in chronological order in that sequence, unless there is no other logical manner of interpreting the sequence.

In Accordance with

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer Readable Medium

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entire embodiment or an embodiment combining software and hardware aspects. Furthermore, the present invention may take the form of carrier medium (e.g., a computer program product on a computer-readable storage medium) carrying computer-readable program code embodied in the medium.

Carrier Medium

This may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor or a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also an open term that also means "including at least" the elements/features that follow the term, but not excluding others. Thus, including is synonymous with and means comprising.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the mobile device industries, communication and broadcasting industries and specifically for methods and systems for interaction of digital media via mobile devices with communication and broadcasting services.

It will be appreciated that the methods/apparatus/devices/systems described/illustrated above at least substantially provide an interactive broadcast management system.

The interactive broadcast management system described herein, and/or shown in the drawings, are presented by way of example only and are not limiting as to the scope of the invention. Unless otherwise specifically stated, individual aspects and components of the system may be modified, or may have been substituted therefore known equivalents, or as yet unknown substitutes such as may be developed in the future or such as may be found to be acceptable substitutes in the future. The interactive broadcast management system may also be modified for a variety of applications while remaining within the scope and spirit of the claimed invention, since the range of potential applications is great, and since it is intended that the present system be adaptable to many such variations.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An interactive broadcast management system including;
   a. an online interactive interface accessible by at least one broadcaster broadcasting content relating to topics and a plurality of online participants;
   b. a server having the necessary applications and databases for operating the system;
   c. at least one communication means being selectively connected between said broadcaster(s) and a selected one of said online participant(s);
   d. at least one interactive tool for assessing the online participant to be selected for engaging with said broadcaster;
   e. at least one feedback tool connected to the online interactive interface and accessible by the at least one broadcaster for monitoring online participants' interaction with others of the plurality of online participants;
   f. and at least one selection tool whereby the interactive broadcast management system provides an online control panel for managing and automating online participants interaction with the broadcaster;
      wherein the system is linked in a networked environment in a manner designed to integrate the broadcaster and online participants via online and standard communication methods;
      wherein the system includes an automatic dynamic creation of chat rooms and sub chat rooms, in real time, based on the topics and interaction of groups of online participants within the chat rooms, and reviews of any two more of:
   a. the number of people joining a sub chat room;
   b. the amount of interaction of those people; and
   c. the range of opinions of those people;
   and as a result of the one or more of those reviews an automatic change in:
      i. the size of the chat room;
      ii. ranking of people in that chat room;
      iii. the number of people to be selected from each chat room to form a pool of engaging participants; and
      wherein the broadcaster actively updates, in real time, the topics and content being broadcast, based on feedback from the feedback tool monitoring online interaction within the chat rooms and the automatic dynamic formation of the chat rooms and sub chat rooms and groups of online participants within the chat rooms.

2. An interactive broadcast management system according to claim 1 wherein the system includes an automatic dynamic management of groups of online participants to form or reform chat rooms in real time based on any one or more reviews of:
   a. the input rate of participants observed by detecting inputting typing character rate of participants;
   b. the amount of interaction of the participants such that they are deemed active; and
   c. the speed of reading rate by participant of comments of other participants observed by detecting scrolling by the reading participant;
   and as a result of the one or more of those reviews an automatic change in:
      i. the interaction rate of participants in a chat room to maintain active participants;
      ii. the size of the chat room;
      iii. the matching of participants by matching reading rate of participants to input rate of participants;
      iv. the expansion, contraction or merger of participants or content in chat rooms.

3. An interactive broadcast management system according to claim 1 wherein a first interactive tool is a topic enquiry tool which enables online participants to ascertain, create and or comment on information pertaining to a current topic being broadcast.

4. An interactive broadcast management system according to claim 3 wherein a user can view what topics have been inquired and when the inquiry was made to determine which topics have been queried within specific time periods to gain information regarding opinion interaction of online participants.

5. An interactive broadcast management system according to claim 1 wherein a second interactive tool is a topic allocation tool which allows online participants to request topics to be broadcast.

6. An interactive broadcast management system according to claim 5 wherein the topic allocation tool is programmed to send an automated message back to the online participants to provide confirmation that the request has been received by the broadcaster.

7. An interactive broadcast management system according to claim 1 including a third interactive tool as a limited sizing chat room tool which allows limited predefined number of online participants to engage in real time online conversations with each other for review by the broadcaster.

8. An interactive broadcast management system according to claim 1 where a fourth interactive tool is a selection tool which enables online participants to provide a feedback directed to another online participant's opinion or comment.

9. An interactive broadcast management system according to claim 8 where the fourth interactive tool includes an initial rating of the online participant's opinion or comment and the provided feedback directed to another online participant's opinion or comment is reflected in the participant's modified rating of opinion or comment wherein the development of the opinions is viewable of the number of people to be selected from each chat room to form a pool of engaging participants to provide the user with a range of modified ratings and therefore development of the topic and interaction of all online participants in that chat room.

10. An interactive broadcast management system according to claim 9 wherein the rating is provided by one or more of the following feedbacks from online participants in that group or by observers:
   a. Noteworthiness
   b. Categorisation of opinion
   c. Agreement with opinion
   d. Change of opinion
      wherein the display of opinions or comments and related rating associated with an online participant is shown in the online interactive interface for use in broadcasting.

11. An interactive broadcast management system according to claim 1 wherein the communication can be made via the internee or any other standard communication means such as phone, email, digital telecommunication or the like.

12. An interactive broadcast management system according to claim 1 wherein a first feedback tool is a noteworthy tool which is adapted to run at least one poll whereby online participants can respond to at least one question or topic or the like nominated by the announcer and announced on-air/via the website.

13. An interactive broadcast management system according to claim 1 wherein a second feedback tool is an interaction tool that allows online participants to vote for a topic currently playing on-air.

14. An interactive broadcast management system according to claim 1 wherein information obtained from the feedback tool(s) is used to compile charts, report and other information to indicate user interest.

15. A method of interactive broadcast management using an interactive broadcast management system including;
   a. an online interactive interface accessible by at least one broadcaster broadcasting content relating to topics and a plurality of online participants;
   b. a server having the necessary applications and databases for operating the system;
   c. at least one communication means being selectively connected between said broadcaster(s) and a selected one of said online participants(s);
   d. at least one interactive tool for assessing the online participant to be selected for engaging with said broadcaster(s);
   e. at least one feedback tool accessible by the at least one broadcaster for monitoring online participants interest of the plurality of online participants;
   f. and at least one selection tool whereby the interactive broadcast management system provides an online control panel for managing and automating online participants interaction with the broadcaster;
      wherein the system is linked in a networked environment in a manner designed to integrate the broadcaster and online participants via online and standard communication methods;
      wherein the system includes an automatic dynamic creation of chat rooms and sub chat rooms, in real time, based on the topics and interaction of groups of online participants within the chat rooms, and reviews of any two more of:
   g. the number of people joining a sub chat room;
   h. the amount of interaction of those people; and
   i. the range of opinions of those people;
   and as a result of one or more of those reviews an automatic change in:
   i. the size of the chat room;
   ii. ranking of people in that chat room;
   iii. the number of people to be selected from each chat room to form a pool of engaging participants;
      wherein the broadcaster actively updates, in real time, the topics and content being broadcast, based on feedback from the feedback tool monitoring online interaction within the chat rooms and the automatic dynamic formation of the chat rooms and sub chat rooms and groups of online participants within the chat rooms.

16. A method of interactive broadcast management according to claim 15 wherein the method includes an automatic dynamic management of groups of online participants to form or reform chat rooms in real time based on any one or more reviews of:
   a. the input rate of participants observed by detecting inputting typing character rate of participants;
   b. the amount of interaction of the participants such that they are deemed active; and
   c. the speed of reading rate by participant of comments of other participants observed by detecting scrolling by the reading participant;
      and as a result of the one or more of those reviews an automatic change in:
   i. the interaction rate of participants in a chat room to maintain active participants;
   ii. the size of the chat room;
   iii. the matching of participants by matching reading rate of participants to input rate of participants;
   iv. the expansion, contraction or merger of participants or content in chat rooms.

* * * * *